(12) United States Patent
Kaytes

(10) Patent No.: US 10,174,878 B2
(45) Date of Patent: *Jan. 8, 2019

(54) AERIAL ADVERTISING DISPLAY APPARATUS

(71) Applicant: Bennett Russell Kaytes, Sunny Isles, FL (US)

(72) Inventor: Bennett Russell Kaytes, Sunny Isles, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/040,746

(22) Filed: Feb. 10, 2016

(65) Prior Publication Data

US 2016/0161047 A1 Jun. 9, 2016

Related U.S. Application Data

(63) Continuation-in-part of application No. 14/644,636, filed on Mar. 11, 2015, now Pat. No. 9,620,040.

(Continued)

(51) Int. Cl.
*F16M 11/18* (2006.01)
*F16M 11/42* (2006.01)
(Continued)

(52) U.S. Cl.
CPC .......... *F16M 11/18* (2013.01); *B66C 13/005* (2013.01); *F16M 11/26* (2013.01); *F16M 11/42* (2013.01);
(Continued)

(58) Field of Classification Search
CPC .. G09F 21/04; G09F 2007/1865; G09F 15/00; G09F 15/0006; G09F 15/0012; G09F 15/0037; G09F 15/0056; G09F 15/0062; G09F 15/0068; G09F 15/0075; G09F 15/0081; B65F 1/122; B65F 1/12; B65F 3/0203; B65F 2003/0266; B66C 13/005
See application file for complete search history.

(56) References Cited

U.S. PATENT DOCUMENTS 2,746,187 A * 5/1956 Ennever .............. G09F 15/0006
40/624
2,942,366 A * 6/1960 Pfaff, Jr. ............. G09F 15/0037
248/230.1

(Continued)

FOREIGN PATENT DOCUMENTS

DE 3606724 A1 * 9/1987
DE 3606724 A1 * 9/1987 ........... B66C 13/005

*Primary Examiner* — Eret C McNichols
(74) *Attorney, Agent, or Firm* — Glenn E. Gold, P.A.; Glenn E. Gold

(57) ABSTRACT

An aerial advertising display apparatus includes a support base for placing on a support surface, a lift mechanism mounted on the support base and being actuatable to change the elevation of an upper end of the lift mechanism above the support surface, and an attachment mechanism supported by the upper end portion of the lift mechanism. The attachment mechanism includes a rearward component attached to the upper end portion of the lift mechanism and a forward component attached to an advertising display mounting frame. The rearward and forward components are linkable to couple and decouple with and from one another so as to correspondingly attach and detach the advertising display mounting frame to and from the upper end portion of the lift mechanism.

16 Claims, 28 Drawing Sheets

Related U.S. Application Data

(60) Provisional application No. 61/951,250, filed on Mar. 11, 2014.

(51) Int. Cl.

| | | |
|---|---|---|
| *F16M 11/26* | (2006.01) | |
| *G09F 15/00* | (2006.01) | |
| *G09F 7/18* | (2006.01) | |
| *G09F 19/22* | (2006.01) | |
| *G09F 21/04* | (2006.01) | |
| *B66C 13/00* | (2006.01) | |

(52) U.S. Cl.
CPC ............... *G09F 7/18* (2013.01); *G09F 15/00* (2013.01); *G09F 19/22* (2013.01); *G09F 21/04* (2013.01); *G09F 2007/1865* (2013.01)

(56) References Cited

U.S. PATENT DOCUMENTS

| | | | | |
|---|---|---|---|---|
| 4,382,743 A | * | 5/1983 | Newell | B66F 9/122 |
| | | | | 212/231 |
| 4,481,729 A | | 11/1984 | Weiller | |
| 4,964,778 A | * | 10/1990 | Muto | B66F 9/0655 |
| | | | | 414/700 |
| 5,015,146 A | | 5/1991 | Barnes et al. | |
| 5,330,308 A | * | 7/1994 | Armando | B65F 3/046 |
| | | | | 294/119.1 |
| 5,475,386 A | * | 12/1995 | Luoma | G08G 1/0955 |
| | | | | 116/63 P |
| 5,542,203 A | * | 8/1996 | Luoma | G09F 13/04 |
| | | | | 340/908 |
| 6,101,750 A | * | 8/2000 | Blesener | G09F 13/04 |
| | | | | 340/815.53 |
| 6,150,996 A | * | 11/2000 | Nicholson | G09F 9/33 |
| | | | | 345/1.3 |
| 6,336,565 B1 | * | 1/2002 | Merkel | B66F 9/061 |
| | | | | 212/168 |
| 6,367,756 B1 | * | 4/2002 | Wang | F16M 11/10 |
| | | | | 248/276.1 |
| 6,505,988 B1 | * | 1/2003 | Oddsen, Jr. | F16M 11/105 |
| | | | | 248/278.1 |
| 6,750,829 B2 | * | 6/2004 | Luoma | G06F 3/147 |
| | | | | 345/1.1 |
| 6,761,000 B1 | | 7/2004 | Heijting et al. | |
| 6,972,689 B1 | * | 12/2005 | Morgan | G09F 21/04 |
| | | | | 340/815.4 |
| 8,523,131 B2 | * | 9/2013 | Derry | F16M 11/04 |
| | | | | 16/338 |
| 9,015,972 B1 | * | 4/2015 | Morgan | G09F 21/048 |
| | | | | 40/209 |
| 9,117,378 B2 | * | 8/2015 | Sipperley | B61D 3/16 |
| 9,311,833 B2 | * | 4/2016 | George, II | G09F 21/04 |
| 9,357,846 B2 | * | 6/2016 | Hung | G06F 1/1601 |
| 9,552,751 B1 | * | 1/2017 | Barker | F21L 13/00 |
| 2004/0011932 A1 | * | 1/2004 | Duff | F16M 11/10 |
| | | | | 248/157 |
| 2006/0218037 A1 | * | 9/2006 | Rogers | B65F 1/122 |
| | | | | 705/308 |
| 2007/0195495 A1 | * | 8/2007 | Kim | F16M 11/105 |
| | | | | 361/679.07 |
| 2007/0217134 A1 | * | 9/2007 | Shin | F16M 11/105 |
| | | | | 361/679.07 |
| 2010/0018097 A1 | | 1/2010 | Xu | |
| 2011/0155740 A1 | | 6/2011 | Zintl et al. | |
| 2013/0284871 A1 | * | 10/2013 | Huang | F16M 11/10 |
| | | | | 248/282.1 |
| 2014/0001331 A1 | * | 1/2014 | Oddsen, Jr. | F16M 11/04 |
| | | | | 248/292.13 |
| 2015/0375977 A1 | * | 12/2015 | Nakazawa | B60K 1/00 |
| | | | | 187/222 |

\* cited by examiner

AERIAL ADVERTISING DISPLAY APPARATUS

CROSS REFERENCE TO RELATED APPLICATIONS

This U.S. non-provisional utility patent application is a continuation-in-part of co-pending U.S. non-provisional patent application Ser. No. 14/644,636, having a filing date of Mar. 11, 2015, which, in turn, claims the benefit of U.S. provisional patent application No. 61/951,250, having a filing date of Mar. 11, 2014, all of which are incorporated-by-reference herein in their entireties.

FIELD OF THE INVENTION

The present invention relates generally to billboard and related aerial displays. More particularly, the present invention is concerned with a mobile apparatus configured and adapted to utilize a telehandler, a crane boom and related aerial extension mechanisms, to releasably engage billboards, lighting structures, mechanical truss assemblies and the like, for controllably raising and maneuvering the engaged structure to a desired position above a ground surface supporting the mobile apparatus.

BACKGROUND OF THE INVENTION

Many types of aerial displays, such as conventional outdoor billboards, are comprised of large structures permanently installed in high-traffic areas alongside streets and highways. They are commonly provided having a relatively large footprint, such as, for example, twelve feet by twenty-four feet.

On the other hand, many advertising and other aerial displays constructed having varying sizes, unusual shapes and three-dimensional geometries, are commonly employed at local events and attractions, such as fairs, festivals, retail establishments and sporting events. Oftentimes, such aerial displays may be placed at particular locations on a temporary basis supported on mobile carts and trailers. In addition to billboards, temporary lighting, temporary mechanical truss structures, and other large aerial displays are often desired at specific locations, often for relatively brief periods of time.

An important advantage of outdoor billboard advertising displays over these other smaller advertising displays is the greater success that outdoor billboard advertising displays have in attracting and catching the attention of passing pedestrians and drivers. This is likely due to their greater height placement and enhanced visibility. However, the permanency of installation of outdoor billboard advertising displays is likely one factor in unduly limiting the scope of their potential utilization.

Accordingly, it would be highly desirable to provide a means for efficiently and effectively attaching/engaging billboards and any other aerial structures in a manner enabling the structure to be mobilized to a given desired location on a temporary as-needed basis.

SUMMARY OF THE INVENTION

The present invention is directed to an innovation that overcomes the deficiencies of the past approaches and the problems that remain unsolved by providing an aerial advertising display or other aerial structure or apparatus facilitating the movement and positioning of the structure from one location to another location with relative ease. The apparatus may incorporate a ground-supported platform or base, which may be mobile, with a lift mechanism mounted thereon, and an attachment mechanism for quickly and easily attaching and detaching a mounting frame of an advertising display (or other non-advertising mechanical structure) to and from the lift mechanism. The mounting frame may support a conventional two-dimensional billboard, or a more customized three-dimensional object, such as artistic representations of brands and logos, which may further incorporate light-emitting diode (LED) and other illumination means.

In an aspect of the invention, an aerial advertising display apparatus includes:

an attachment mechanism supported above a support surface by an upper end portion of an aerial lift mechanism being actuatable to change the elevation of the aerial lift mechanism upper end portion, and the attachment mechanism therewith, above the support surface, the attachment mechanism including: a rearward component attached to the upper end portion of the aerial lift mechanism, the rearward component including an upright rearward member having at least one coupling site thereon; a forward component attached to and disposed rearwardly of an advertising display mounting frame, the forward component including an upright forward member having at least one coupling site thereon, the respective coupling sites of the upright rearward and forward members being configured to enable coupling and decoupling the upright rearward and forward members, and thereby the rearward and forward components, respectively to and from one another, and at least one elongated link configured to detachably attach with the respective coupling sites on the upright rearward and forward members so as to couple and decouple the upright rearward and forward members with and from one another to thereby correspondingly enable attaching and detaching the advertising display mounting frame to and from the upper end portion of the aerial lift mechanism.

In another aspect, the rearward component of the attachment mechanism may also include a rear-mounting structure disposed forwardly of the upright rearward member of the rearward component and rearwardly of the upright forward member of the forward component, the rear mounting structure being configured to permit the at least one elongated link to pass by and extend in opposite fore and aft directions from the rear mounting structure to the respective coupling sites on the upright rearward and forward members of the rearward and forward components.

In another aspect, an aerial advertising display apparatus may include: at least one advertising display mounting frame including upper and lower brace portions being spaced apart from one another; and an attachment mechanism supported above a support surface by an upper end portion of an aerial lift mechanism being actuatable to change the elevation of the aerial lift mechanism upper end portion, and the attachment mechanism therewith, above the support surface, the attachment mechanism including a rearward component attached to the upper end portion of the aerial lift mechanism, a forward component attached to the upper and lower brace portions of the advertising display mounting frame, the forward component including an upright member having at least one coupling site thereon for enabling coupling and decoupling the forward component respectively to and from the rearward component, a pair of first elongated members laterally spaced apart from one another and extending in a transverse relationship, and being attached, to the upper and lower brace portions of the at least one display mounting frame, and a pair of second elongated members laterally spaced apart and extending fore-and-aft and respectively interconnecting the upright member and the pair of first elongated members.

In another aspect, each of the upper and lower brace portions of the at least one advertising display mounting frame may include a plurality of elongated rods and a multiplicity of trusses. The elongated rods may be spaced-apart and extend parallel to one another so as to define a top, a bottom and a pair of opposite sides of each of the brace portions. The trusses extend between, and are attached to, the elongated rods defining the top, bottom and pair of opposite sides of each of the brace portions. Also, the at least one advertising display mounting frame further may include right and left brace portions, each including another plurality of the elongated rods and another multiplicity of the trusses, extending between and interconnecting corresponding opposite ends of the upper and lower brace portions.

In another aspect, a mobile aerial advertising display apparatus includes: at least one advertising display mounting frame including upper and lower brace portions being spaced apart from one another; a ground-supported mobile chassis; a lift mechanism including a telescopic boom support on the mobile chassis and being actuatable to undergo rotational movement clockwise and counterclockwise directions horizontally and vertically relative to the mobile chassis so as to change the elevation of an upper end portion of the lift mechanism above the ground; and an attachment mechanism supported above the ground by the upper end portion of the lift mechanism, the attachment mechanism including:

a rearward component attached to the upper end portion of the lift mechanism, the rearward component including an upright rearward member having spaced apart coupling sites thereon, a forward component attached to and disposed rearwardly of the upper and lower brace portions of the at least one advertising display mounting frame, the forward component including an upright forward member having spaced apart coupling sites thereon being correspondingly paired with the spaced apart coupling sites on the upright rearward member, the respective correspondingly paired coupling sites of the upright rearward and forward members being configured to enable coupling and decoupling the upright rearward and forward members, and thereby the rearward and forward components, respectively to and from one another, and elongated links configured to detachably attach with the respective correspondingly paired coupling sites on the upright rearward and forward members so as to couple and decouple the upright rearward and forward members with and from one another to thereby correspondingly attach and detach the advertising display mounting frame to and from the upper end portion of the lift mechanism.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION OF EXEMPLARY IMPLEMENTATIONS

Figure 1:
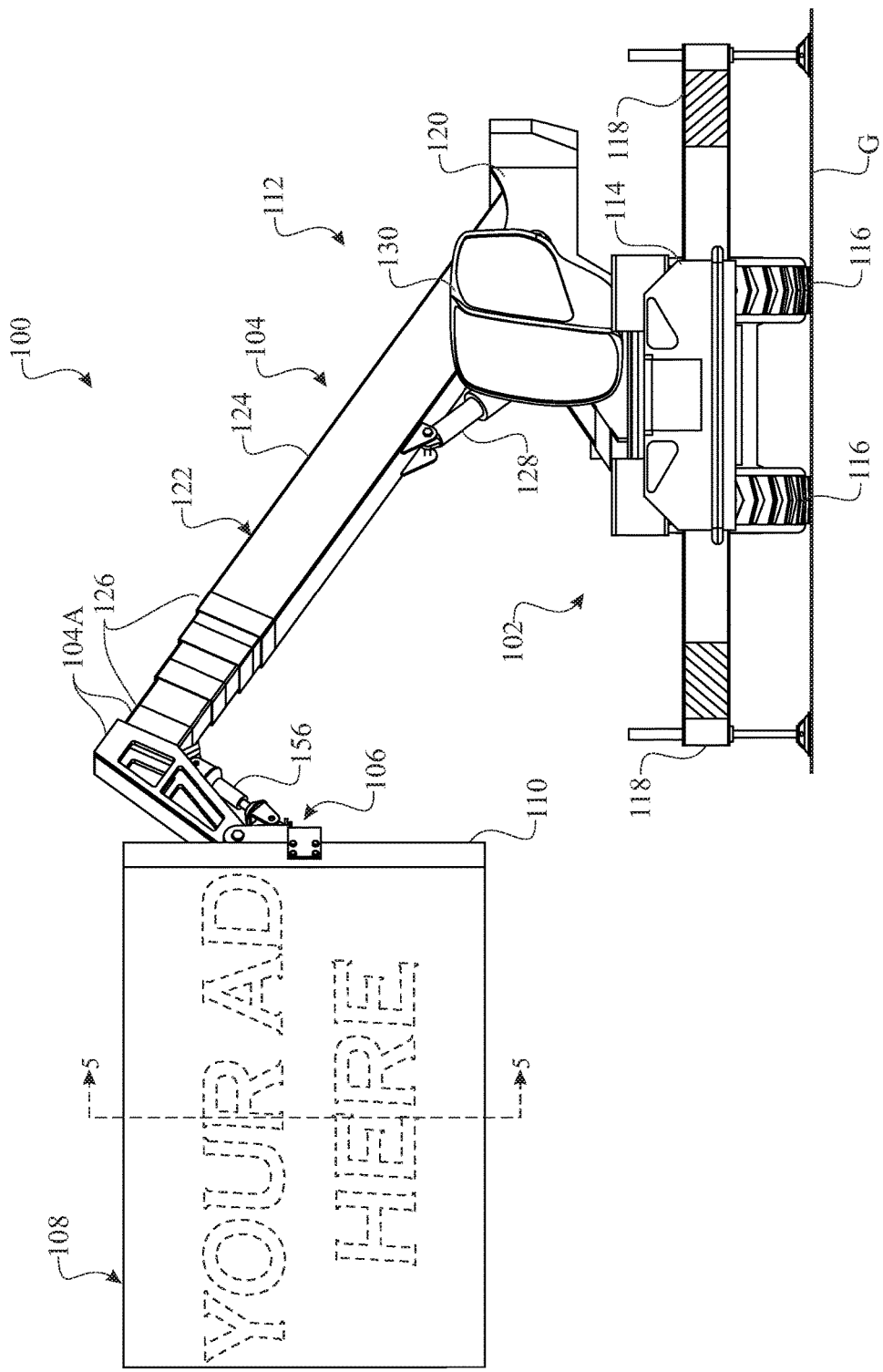
FIG. 1 presents a front elevation view of an exemplary embodiment of an aerial advertising display apparatus in accordance with the present invention having a ground-supported base and a lift mechanism mounted thereon and being capable of being actuated to change the elevation of an advertising display supported above the ground by the lift mechanism.
Figure 2:
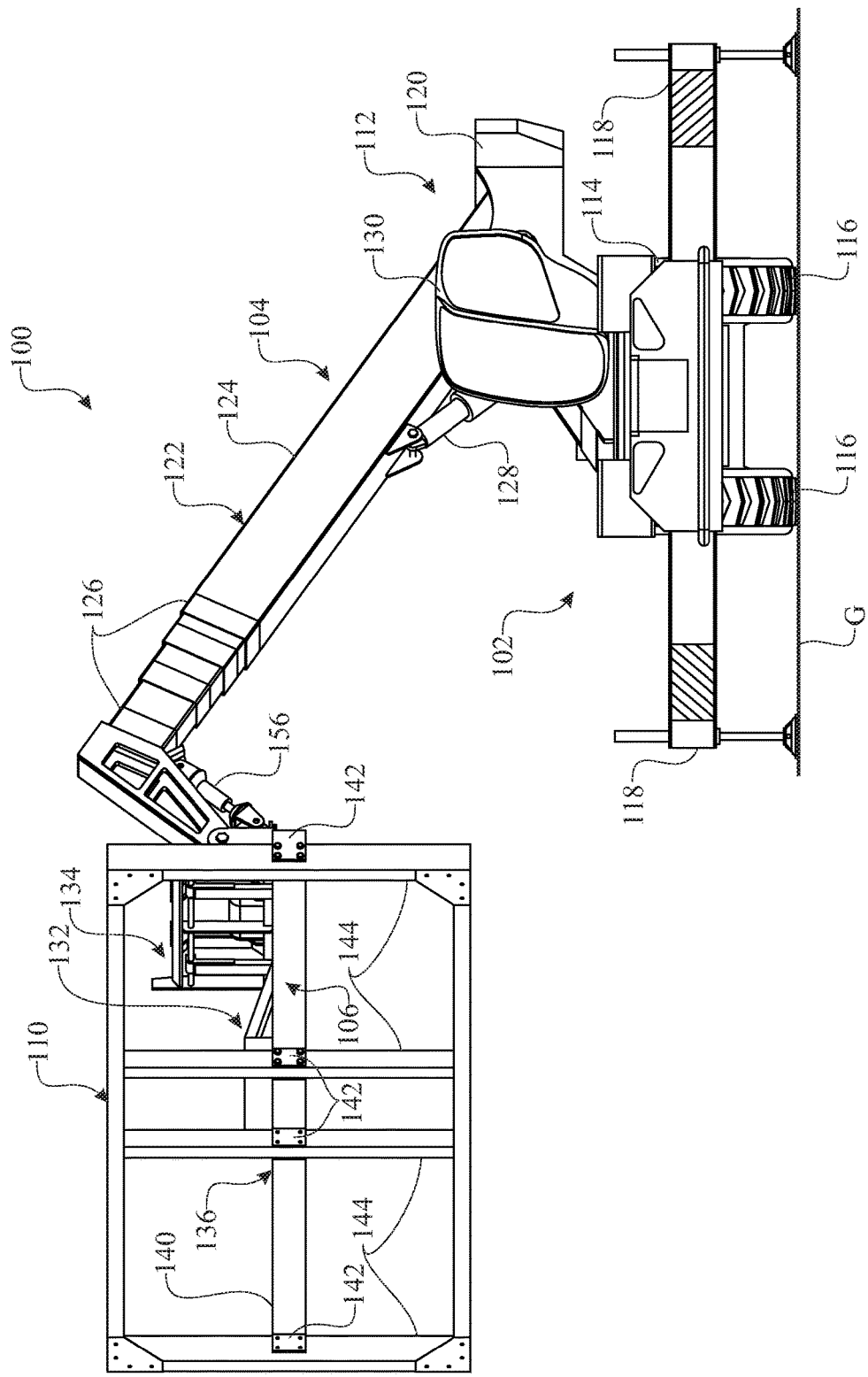
FIG. 2 presents a top front elevation view of the aerial advertising display apparatus originally introduced in FIG. 1, with a poster of the advertising display removed from the advertising display mounting frame to expose an attachment mechanism of the apparatus located at the upper end portion of the lift mechanism.
Figure 3:
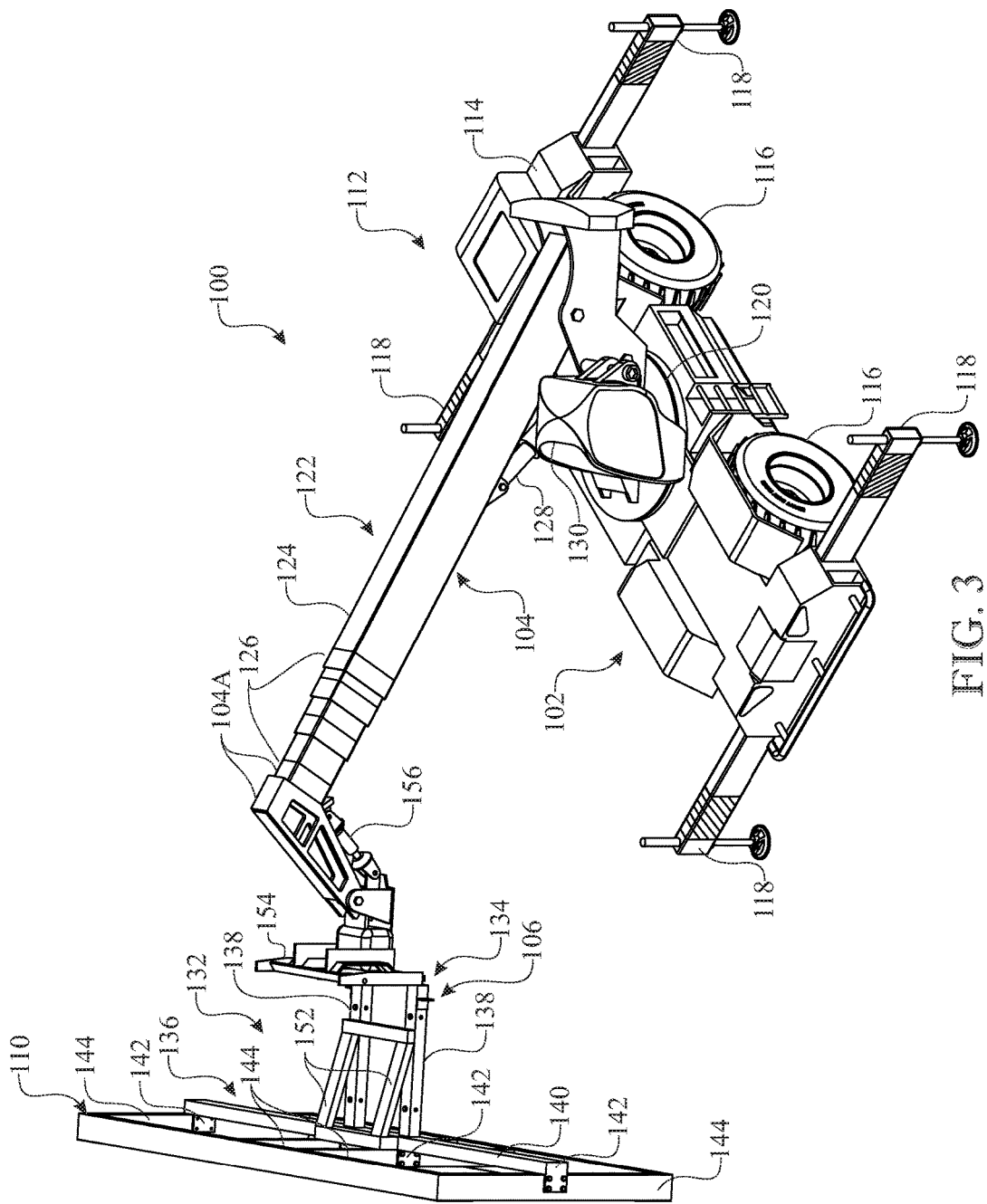
FIG. 3 presents a top isometric view of the aerial advertising display apparatus previously presented in FIG. 2, illustrating forward and rearward components of the attachment mechanism coupled with one another so as to attach the advertising display mounting frame to the upper end portion of the lift mechanism of the apparatus.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. The implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIGS. 1-3, 6 and 7, there is illustrated an exemplary embodiment of an aerial advertising display apparatus, generally designated 100, in accordance with the present invention. The apparatus 100 basically includes a support base 102 placed on a support surface G, a lift mechanism 104 mounted on the support base 102, and an attachment mechanism 106 supported by an upper end portion 104A of the lift mechanism 104. The lift mechanism 104 of the apparatus 100 is actuatable, or capable of being actuated, to change the elevation above the support surface G, such as the ground, of the upper end portion 104A of the lift mechanism 104 and thus the elevation of the attachment mechanism 106 and an advertising display 108 supported by the attachment mechanism 106. The advertising display 108 may employ LED illumination and include an advertising display mounting frame 110 that may carry, by way of example but not limitation, a conventional two-dimensional billboard made of canvas or other panel material, preferably 12×24 feet in size, or a more customized three-dimensional object, such as artistic depictions of brands and logos. The advertising display mounting frame 110 can be made of aluminum, steel or any other suitable materials.

The support base 102 and lift mechanism 104 of the apparatus 100, by way of example but not limitation, may be basic components incorporated by an aerial lift vehicle 112 that may be mobile and either self-propelled or towed by a motor-driven vehicle. The support base 102 may include a chassis 114 of the vehicle 112 supported on wheels 116 and having a plurality of outrigger stabilizers 118 extendable from the chassis 114 to prevent tip-over of the vehicle 112 during its use. The support base 102 also may include a counterweighted turntable 120 mounted for rotation on the chassis 114 about a vertical axis. The lift mechanism 104 may be a telescopic boom 122. The telescopic boom 122 typically includes an outer boom section 124 pivotally mounted at one end to the turntable 120, and a plurality of inner boom sections 126 being telescopically slidably received within one another and within the outer boom section 124 and terminating in the upper end portion 104A of the lift mechanism 104. The upper end portion 104A of the lift mechanism 104 is moved between different elevations above the ground G by extending and retracting the inner boom sections 126, relative to one another and to the outer boom section 124, using one or more hydraulic cylinders (not shown) and/or by rotatably or pivotally moving the outer boom section 124 in clockwise or counterclockwise directions upwardly and downwardly relative to the turntable 120 using a hydraulic cylinder 128. Suitable controls (not shown) located in a cab 130 supported on the turntable 120 may be manipulated by an operator in the cab 120 to operate such functions as lift mechanism angle and extension, and rotation of the lift mechanism 104 about a vertical axis, along with engine, steering and braking controls. It should be understood that the lift mechanism of the aerial advertising display apparatus may take any one of various forms, such as that of a telehandler or a crane, by way of example but not limitation. The various embodiments of the attachment mechanisms disclosed herein may readily accommodate being supported by any of these forms of the lift mechanism, such as the telehandler or crane, in accordance with the present invention. Further, each advertising display 108 may have multiple telehandlers support it at the same time.

Referring now to FIGS. 1-10, the attachment mechanism 106 of the apparatus 100 basically includes a forward component 132 and a rearward component 134. The forward component 132 is attached to and disposed rearwardly of the advertising display mounting frame 110. The rearward component 134 is attached to the upper end portion 104A of the lift mechanism 104. The forward and rearward components 132, 134 of the attachment mechanism 106 are configured to interfit with one another, so as to attach with, and detach from, one another to correspondingly couple and decouple the advertising display mounting frame 110 to and from the upper end portion 104A of the lift mechanism 104.

More particularly, as best seen in FIGS. 4-6 and 8-10, the forward component 132 of the attachment mechanism 106 includes a mounting structure 136 and a pair of elongated tubular members 138. The mounting structure 136 is attached at a rear side to forward ends of the tubular members 138 and is configured at a front side to detachably attach to the advertising display mounting frame 110. The mounting structure 136 includes an elongated beam 140 extending in a transverse relationship to the tubular members 138 and a plurality of connectors in the form of a plurality of plates 142 attached on, and projecting forwardly from, the front side of the beam 140. The plates 142 are attached respectively to sides of laterally spaced apart upright members 144 of the advertising display mounting frame 110. For example, fasteners 146 are inserted through apertures 148 in the plates 142 and tightened into holes 150 in the upright members 144 aligned with the apertures 148.

The elongated tubular members 138 of the forward component 132 project rearwardly from the elongated beam 140 of the mounting structure 136. The tubular members 138 are laterally spaced apart and extend fore-and-aft and parallel to one another. The forward component 132 also includes braces 152 extending between and attached to the elongated beam 140 and the tubular members 138 so as to reinforce the structural integrity of the forward component 132 of the attachment mechanism 106.

Also, as best seen in FIGS. 3-6, the rearward component 134 of the attachment mechanism 106 includes an upright rear mounting structure 154 pivotally mounted to the upper end portion 104A of the lift mechanism 104 and an actuator 156, such as a hydraulic cylinder, pivotally mounted to the upper end portion 104A of the lift mechanism 104 and coupled to the rear mounting structure 154. The actuator 156 is selectively operable to pivotally move the rear mounting structure 154 upwardly and downwardly relative to the lift mechanism 104 in order to place the advertising display mounting frame 110 in a desired elevated orientation. The rearward component 134 also includes a pair of right-angled members 158 having upper portions 160 that maintain the rearward component 134 stationarily mounted to the rear mounting structure 154. The right-angled members 158 also have lower portions in the form of forwardly-projecting tines 162 extending forwardly from the lower ends of the upper portions 160 and parallel to one another such that the tines 162 are configured to slidably insert into and interfit with the rearwardly-projecting elongated tubular members 138 of the forward component 132 of the attachment mechanism 106.

The attachment mechanism 106 further includes a plurality of fasteners 164 and aligned pairs of apertures 166, 168 formed respectively in the tubular members 138 of the forward component 132 and in the tines 162 of the rearward component 134. The fasteners 164 are insertable through selected ones of the pairs of apertures 166 through the tubular members 138 and selected ones of the pairs of apertures 168 through the tines 162 of the rearward component 134 when the selected pairs of apertures 166, 168 are aligned with each other as a result of the tubular members 138 and tines 162 being interfitted with one another.

Figure 11:
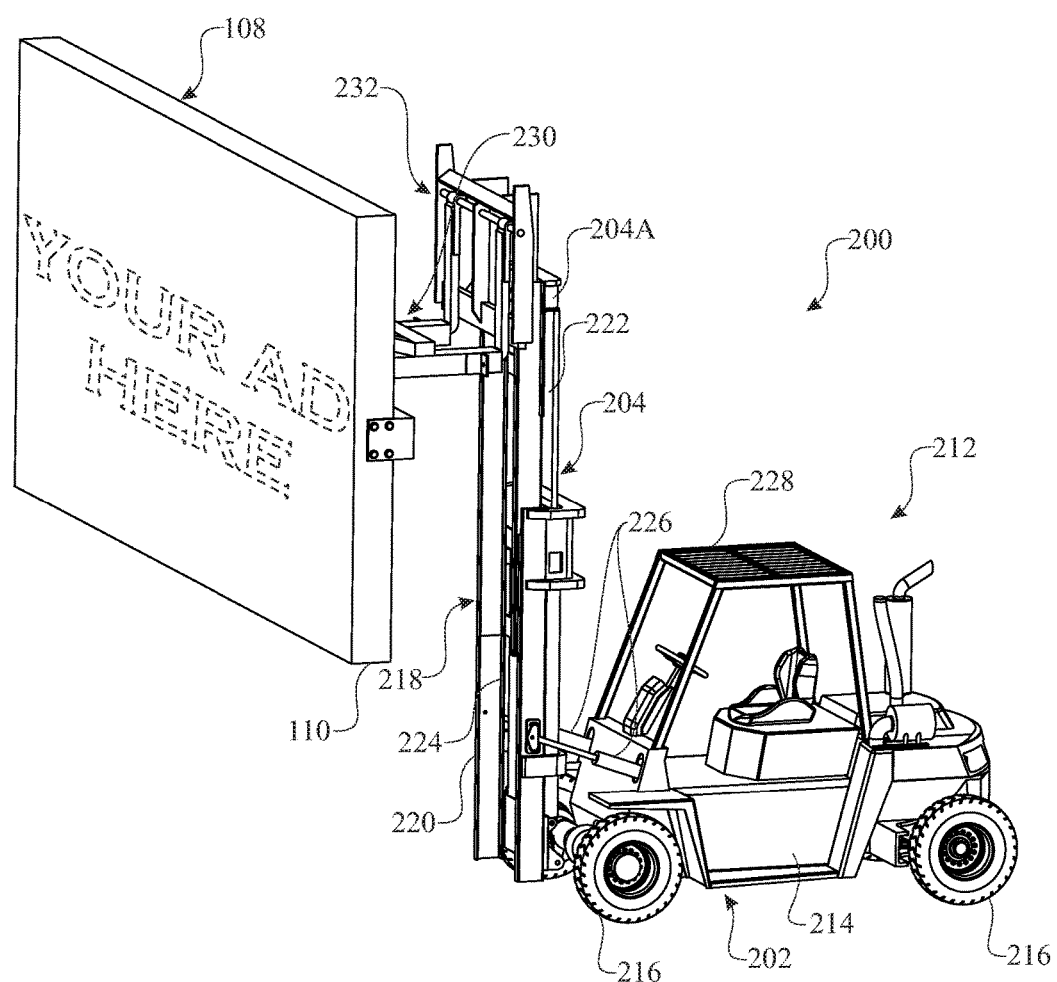
FIG. 11 presents a side isometric view an exemplary alternative embodiment of an aerial advertising display apparatus in accordance with the present invention, having a ground-supported base and a lift mechanism mounted thereon and capable of being actuated to change the elevation of an advertising display supported by the lift mechanism.

Referring now to FIG. 11, there is illustrated an exemplary alternative embodiment of an aerial advertising display apparatus, generally designated 200, in accordance with the present invention. The apparatus 200 basically includes a support base 202 placed on a support surface G, a lift mechanism 204 mounted on the support base 202, and an attachment mechanism 206 supported by an upper end portion 204A of the lift mechanism 204. The lift mechanism 204 of the apparatus 200 is actuatable to change the elevation above the support surface G, such as the ground, of the upper end portion 204A of the lift mechanism 204 and thus the elevation of the attachment mechanism 206 and an advertising display 208 supported by the attachment mechanism 206. The advertising display 208 includes an advertising display mounting frame 210 that may support, by way of example but not limitation, a conventional two-dimensional billboard, or a more customized three-dimensional object, such as artistic representations of brands and logos.

The support base 202 and lift mechanism 204 of the apparatus 200, by way of example but not limitation, may be basic components incorporated by a mobile lift truck or vehicle 212. The support base 202 may include a chassis 214 of the vehicle 212 supported on wheels 216. The lift mechanism 204 may be a telescopic upright channel structure 218 mounted to the chassis 214. The telescopic channel structure 218 typically include an outer elongated channel section 220 pivotally mounted at one end to the chassis 214, and at least one inner elongated channel section 222 being telescopically slidably received within the outer channel section 220 and terminating in the upper end portion 204A of the lift mechanism 204. The upper end portion 204A of the lift mechanism 204 is moved between different elevations above the ground G by extending and retracting the inner channel section 222 relative to the outer channel section 220, using one or more hydraulic cylinders 224 and/or by rotatably or pivotally moving the outer channel section 220 upwardly and downwardly relative to the chassis 214 using hydraulic cylinders 226. Suitable controls (not shown) located in a cab 228 may be manipulated by an operator in the cab 228 to operate such functions as lift mechanism angle and extension, and rotation of the lift mechanism 204 about a vertical axis, along with engine, steering and braking controls.

The attachment mechanism 206 supported by the upper end portion 204A of the lift mechanism 204 includes a forward component 230 attached to an advertising display mounting frame 210, and a rearward component 232 attached to the upper end portion 204A of the lift mechanism 204. The forward and rearward components 230, 232 of the attachment mechanism 206 of the apparatus 200 are the same as the forward and rearward components 132, 134 of the attachment mechanism 106 of the apparatus 100. Thus, a detailed description of the forward and rearward components 230, 232 of apparatus 200 need not be repeated herein; instead attention is directed to the detailed description of the forward and rearward components 132, 134 of the apparatus 100 set forth earlier with reference to FIGS. 4-6 and 8-10.

Figure 4:
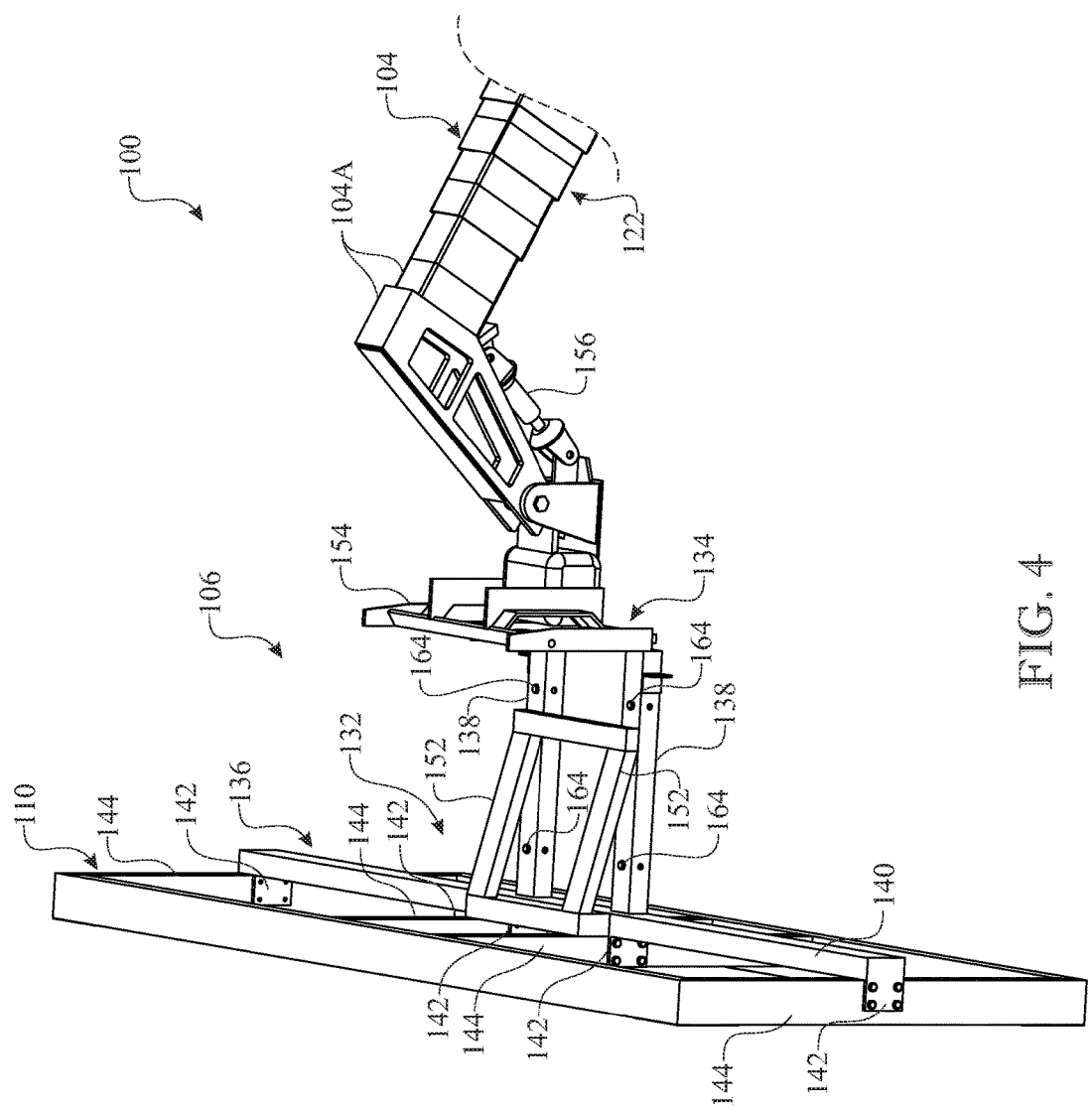
FIG. 4 presents an enlarged top isometric view of a fragmentary portion of the aerial advertising display apparatus as previously presented in FIG. 3, illustrating the upper end portion of the lift mechanism with forward and rearward components of the attachment mechanism interfitted together so as to attach the advertising display mounting frame to the lift mechanism.
Figure 5:
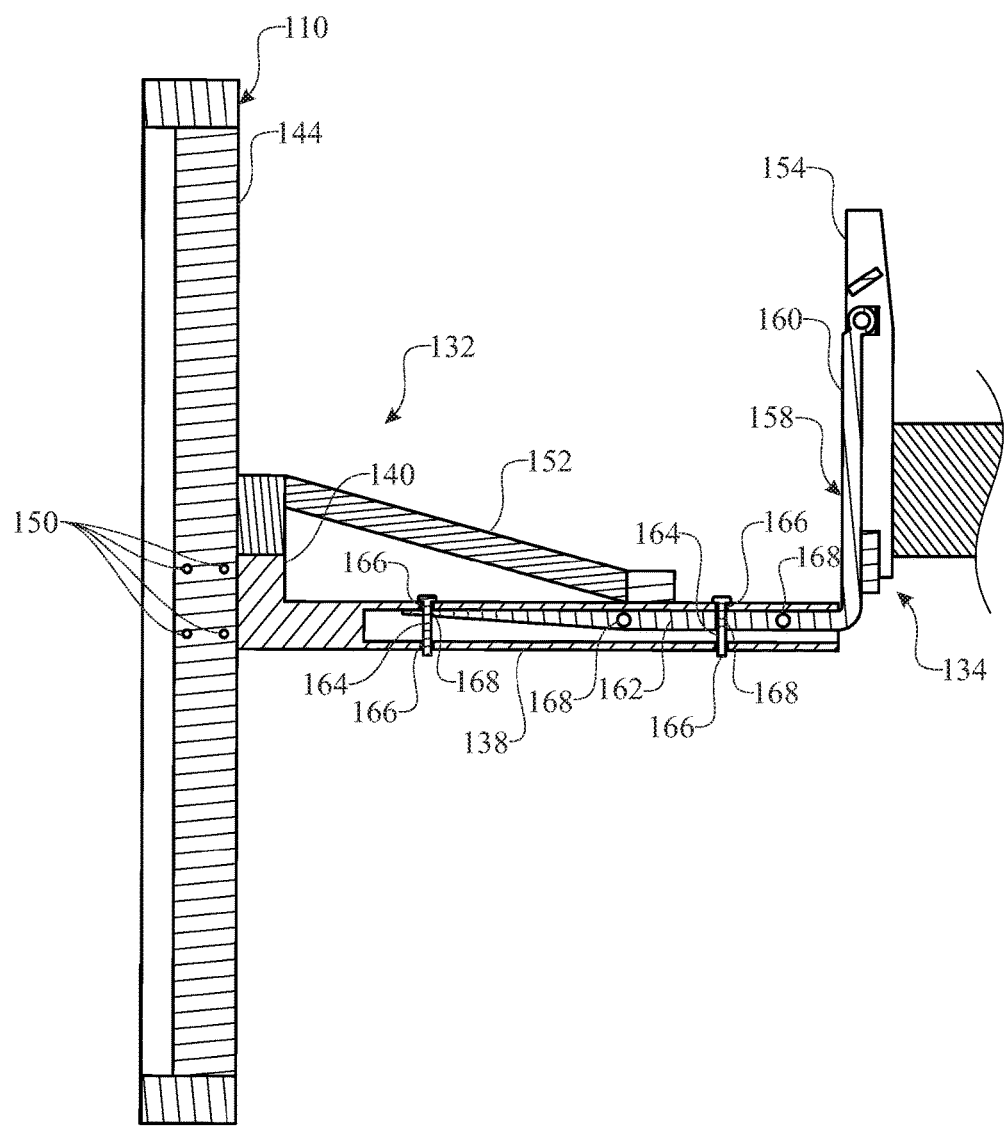
FIG. 5 presents a cross-sectional view of the advertising display mounting frame and the attachment mechanism of the aerial advertising display apparatus (taken vertically along cut line 5-5 of FIG. 1) through a right side portion of the advertising display mounting frame and the attachment apparatus.
Figure 6:
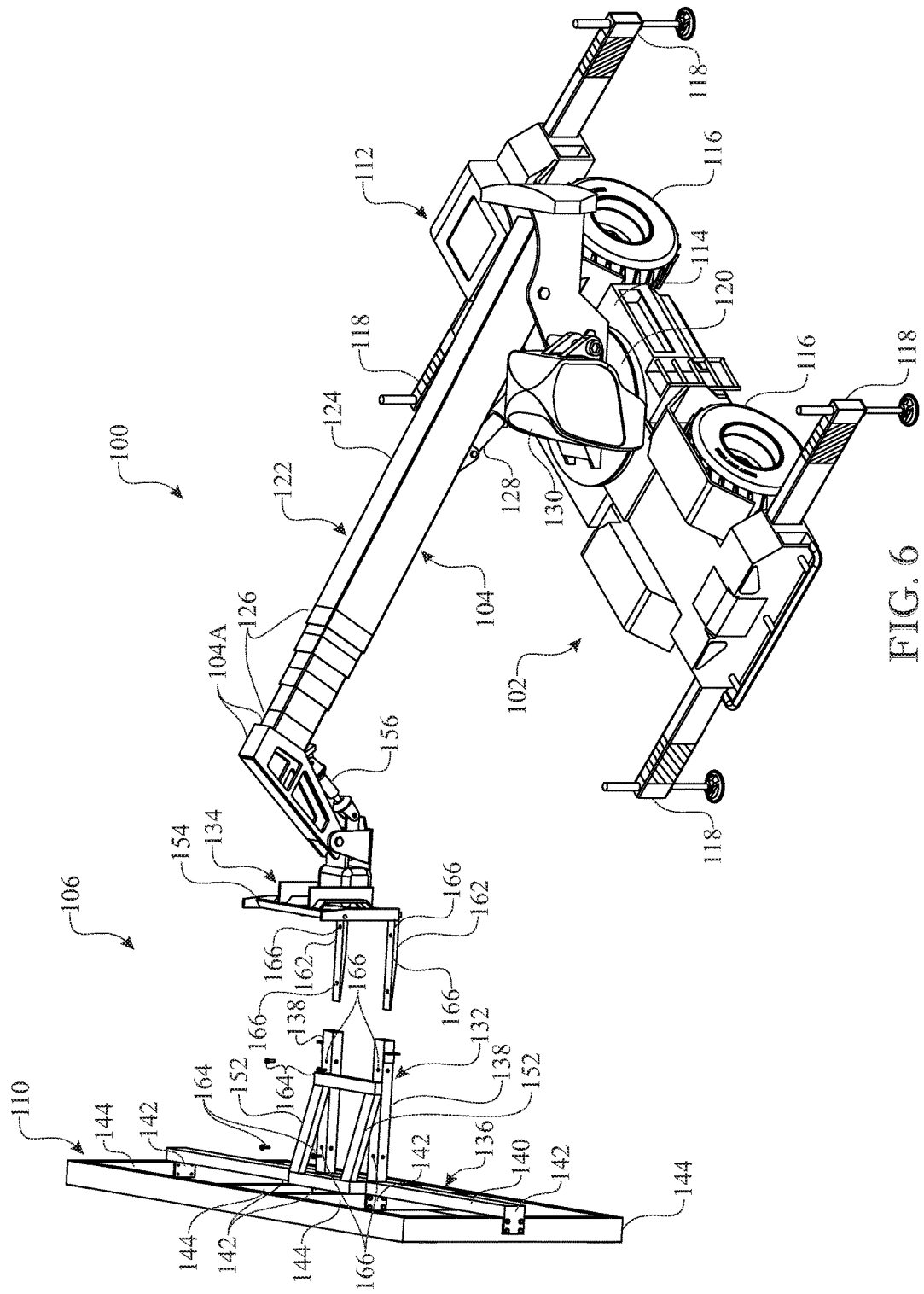
FIG. 6 presents a top isometric view of the aerial advertising display apparatus similar to that as previously presented in FIG. 3, but now illustrating the forward and rearward components of the attachment apparatus detached from one another so as to decouple the advertising display mounting frame from the upper end portion of the lift mechanism of the apparatus.
Figure 7:
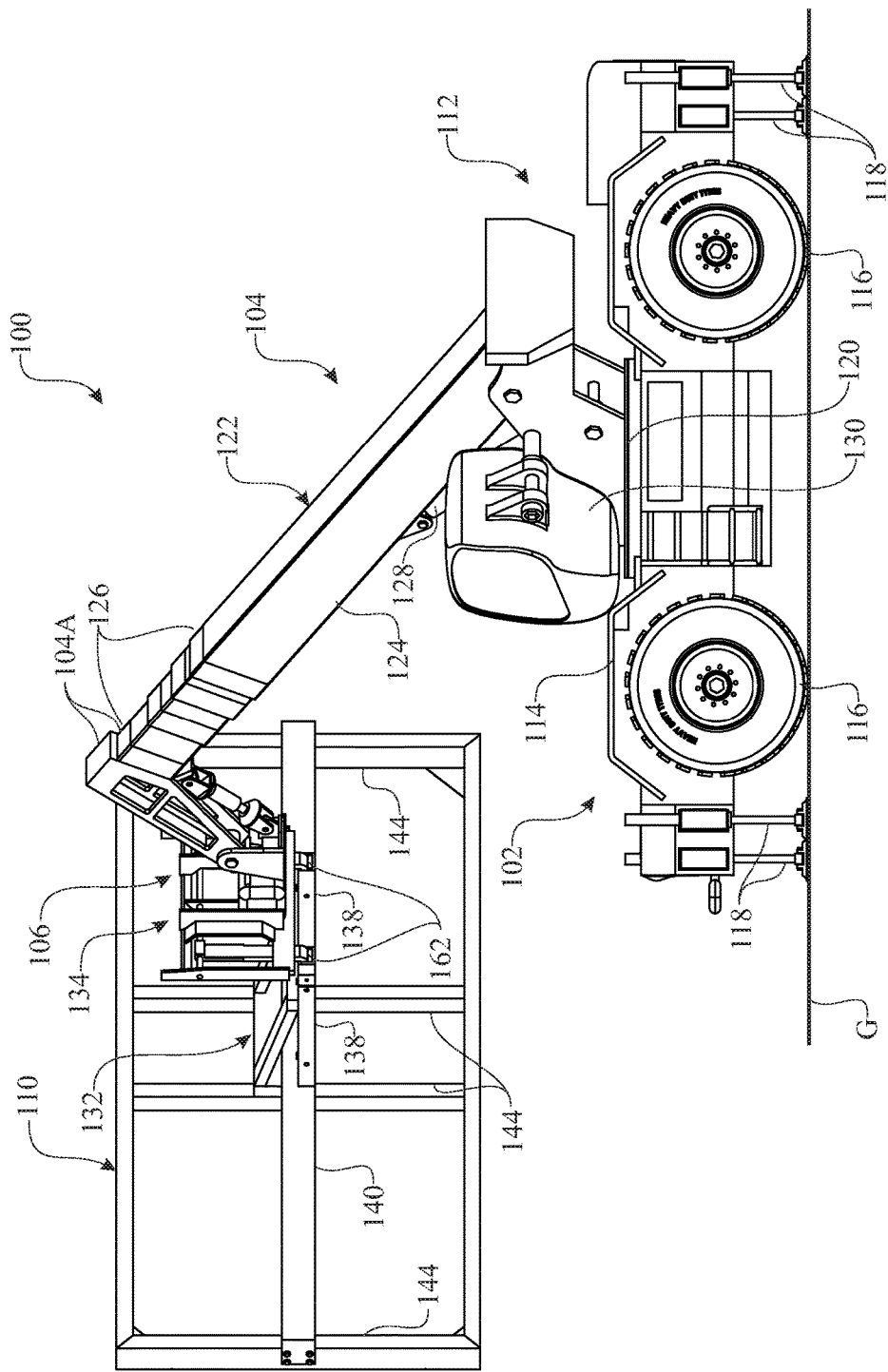
FIG. 7 presents a side elevation view of the aerial advertising display apparatus as seen from the right side of the apparatus as previously presented in FIG. 2.
Figure 8:
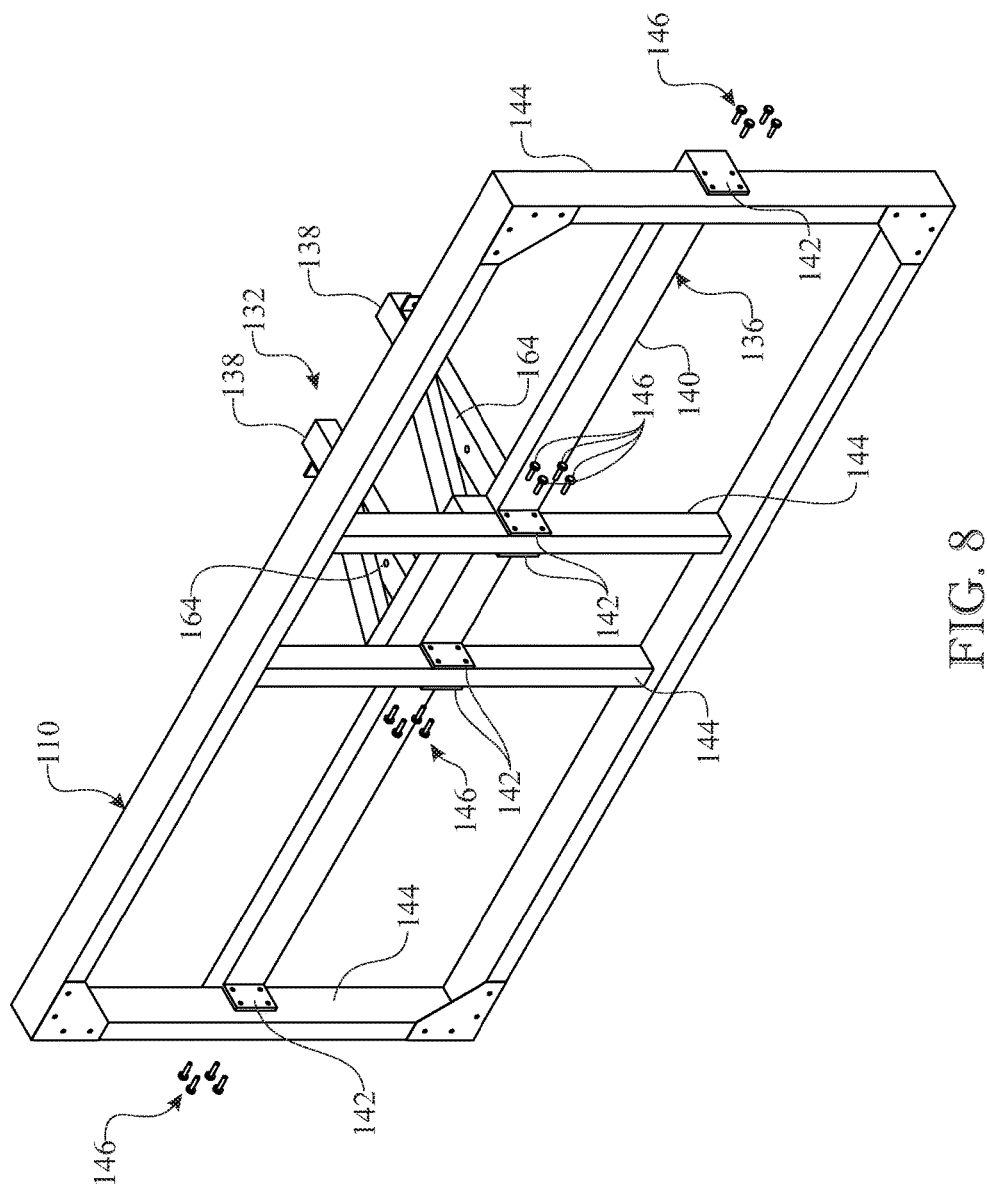
FIG. 8 presents a top front isometric view of the forward component of the attachment mechanism attached to the advertising display mounting frame of the advertising display.
Figure 9:
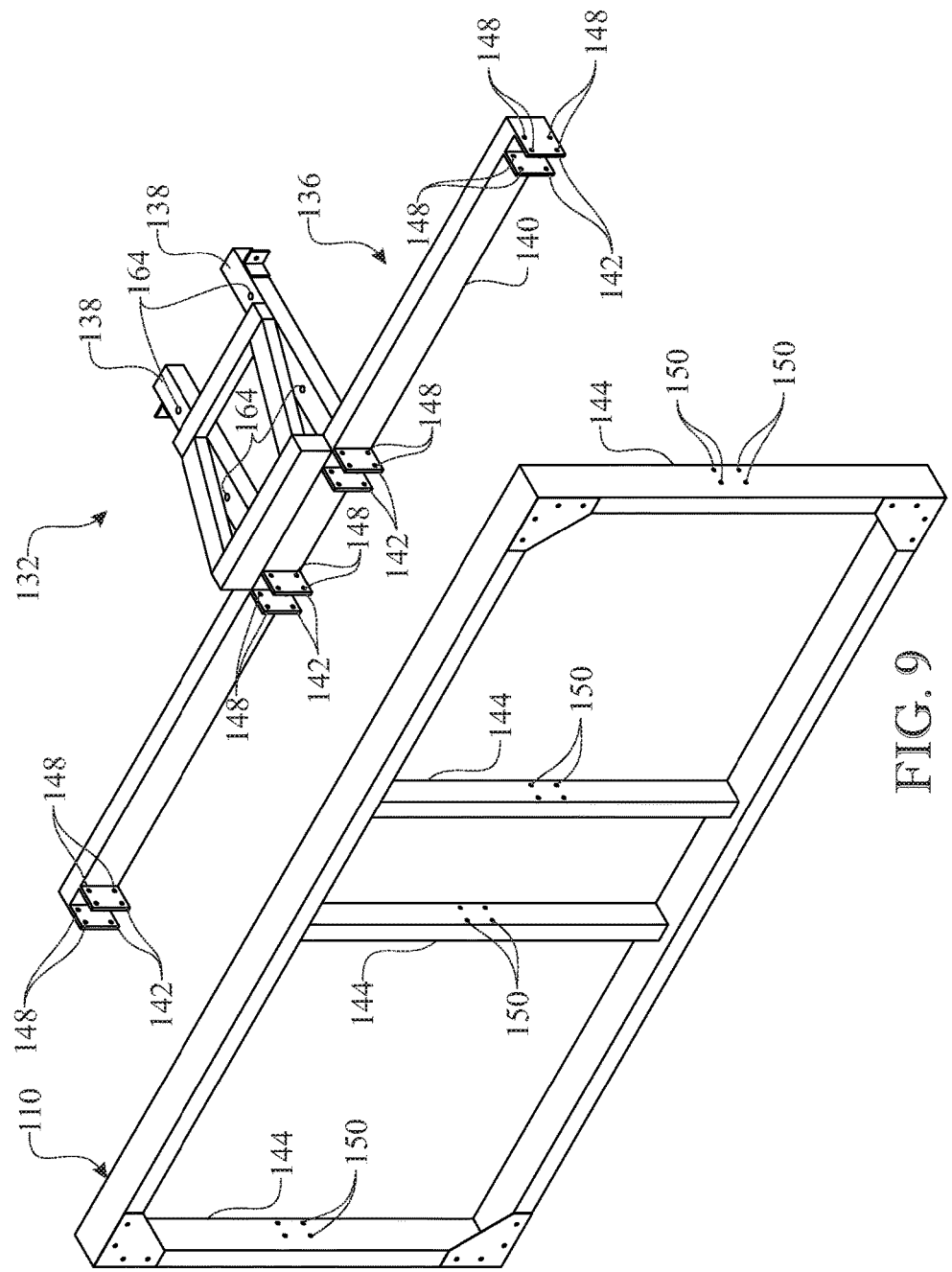
FIG. 9 presents a top front isometric view of the forward component of the attachment mechanism detached from the advertising display mounting frame of the advertising display.
Figure 10:
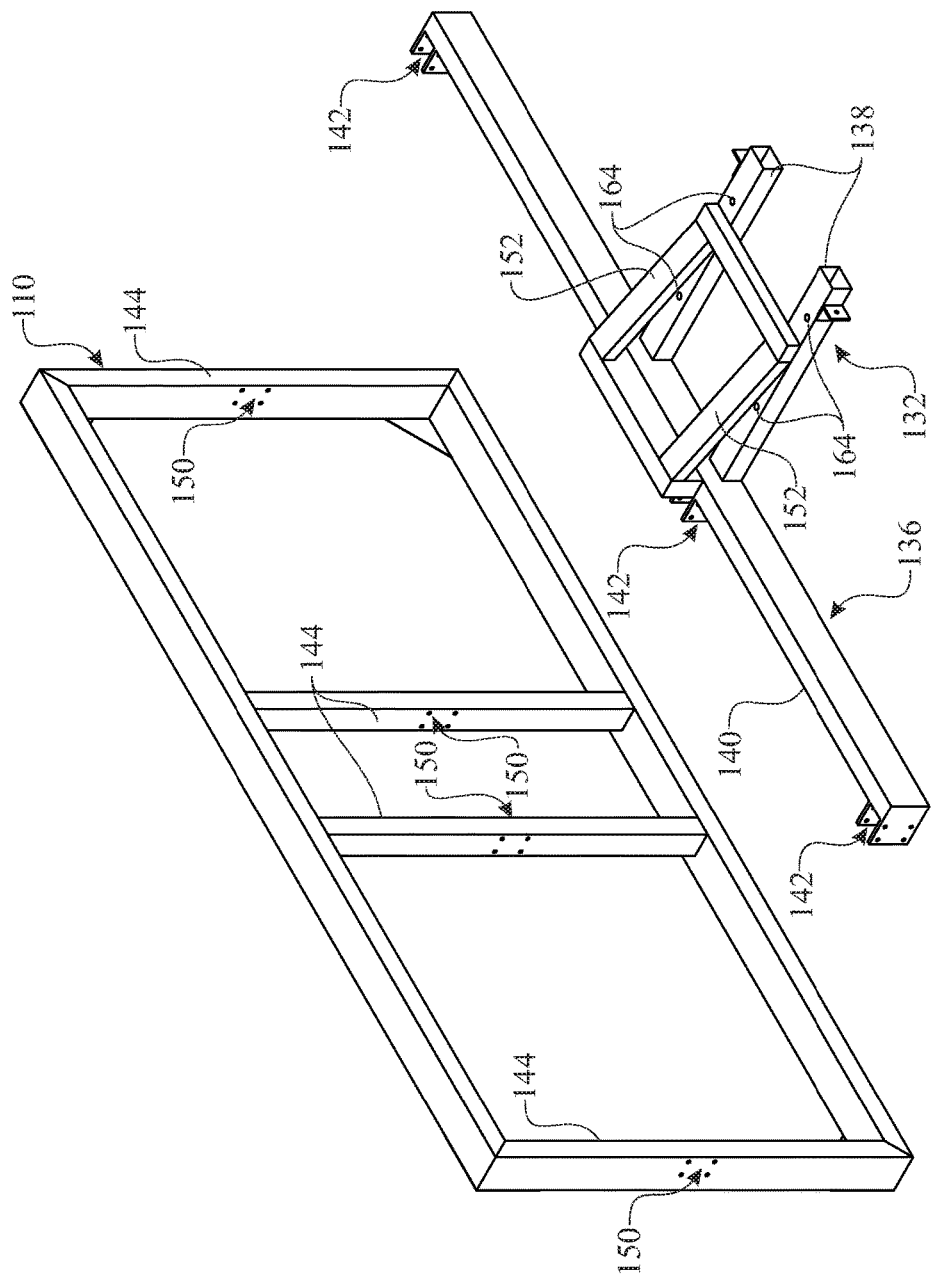
FIG. 10 presents a top rear isometric view of the forward component of the attachment mechanism, shown detached from the advertising display mounting frame of the advertising display.
Figure 12:
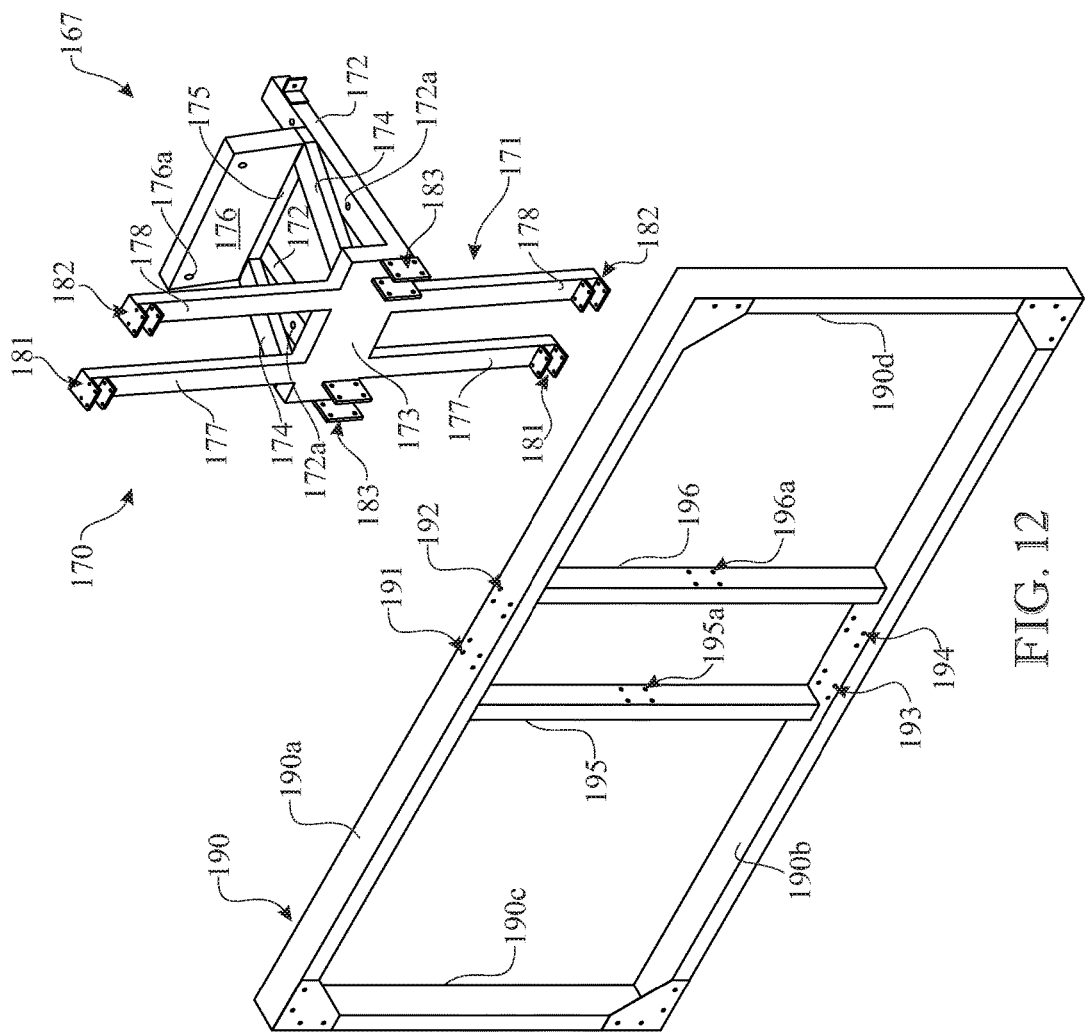
FIG. 12 presents a top front isometric exploded view of a forward component of an attachment mechanism of the apparatus shown detached from the advertising display mounting frame in accordance with an alternate implementation.
Figure 13:
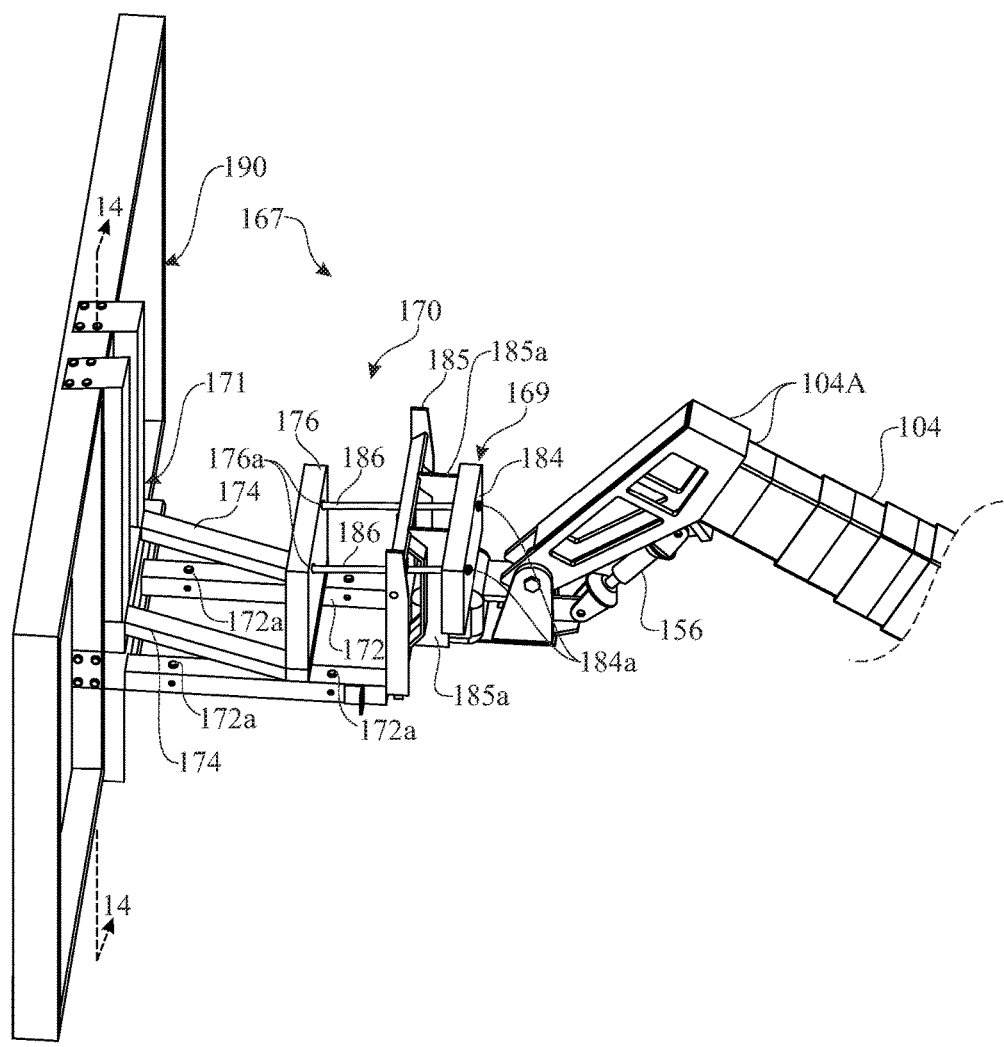
FIG. 13 presents a top side isometric view of the alternative attachment mechanism showing the forward component depicted in FIG. 12 assembled to the advertising mounting frame and to the rear component of the attachment mechanism.
Figure 14:
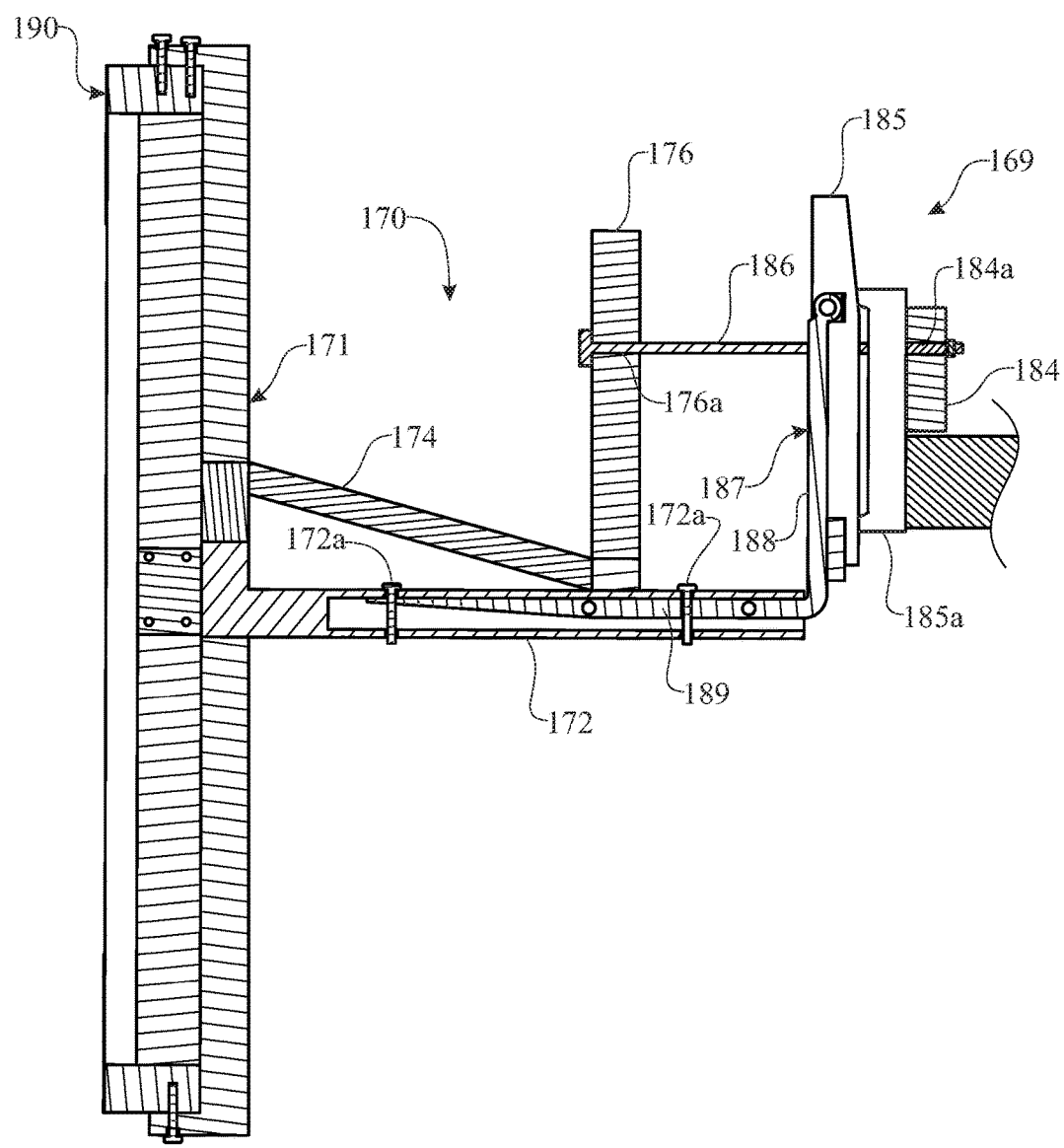
FIG. 14 is a vertical section view of the alternative attachment mechanism and aerial advertising display mounting frame as seen along section lines 14-14 of FIG. 13.

Referring now to FIGS. 12-14, there is illustrated another exemplary alternate implementation of an attachment mechanism, generally designated 167, of aerial advertising display apparatus of the present invention, in which the rearward and forward components 134, 132 of the attachment mechanism 106, as seen FIG. 4, are replaced by rearward and forward components, generally designated 169, 170. As will be described hereinafter, the forward component 170 of the attachment mechanism 167 is now capable of accommodating a wider advertising display mounting frame 190. The forward component 170 includes an upright front mounting structure 171 and a pair of spaced-apart parallel left and right tubular members 172 extending rearwardly from a main cross body 173 of the front mounting structure 171. Each of the tubular members 172 includes respective apertures 172a extending vertically therethrough. A pair of corresponding spaced-apart, left and right angled tubular members 174 is provided extending in a rearward and downward angle from an upper end of main cross body 173 and terminating at a cross brace 175 supported upon and spanning right and left tubular members 172. The forward component 170 also includes an upright forward stabilizing member or plate 176, spaced rearwardly from the upright front mounting structure 171, which upright forward member or plate 176 at a lower end thereof interfaces with and fixedly mounts on an upper surface of cross brace 175. The upright forward member 176 has spaced-apart, horizontally-disposed apertures 176a extending completely therethrough for a purpose explained further hereinbelow. The front mounting structure 171 of the forward component 170 further includes pairs of spaced-apart right and left upwardly and downwardly extending vertical elongated beams 177, 178. The right elongated beam 177 has corresponding pairs of connector plates 181 and the left elongated beam 178 has corresponding pairs of connector plates 182 at upper and lower ends thereof. Each of the connector plates 181, 182 has a plurality of aligned apertures extending therethrough. Furthermore, right and left pairs of connector plates 183 respectively extend forwardly from a front surface of main cross body 173 of the front mounting structure 171, each also having a plurality of aligned apertures extending therethrough.

The forward component 170 of the attachment mechanism 167, as just described, is thus configured to attach with a somewhat wider aerial advertisement display mounting frame, generally designated 190. The mounting frame 190 has a rectilinear geometry made up of contiguous frame segments 190a-190d and a pair of vertically-disposed, spaced-apart, right and left interior braces 195, 196, respectively, extending between interior-facing surfaces of upper frame segment 190a and lower frame segment 190b, each having a respective plurality of brace apertures 195a, 196a extending therethrough. Furthermore, two sets of apertures 191, 192 are provided extending through upper frame segment 190a, and two corresponding aligned sets of apertures 193, 194 are provided extending lower frame segment 190b.

During assembly of the forward component 170 to the display mounting frame 190, from the unassembled condition shown in FIG. 12 to the assembled condition shown in FIGS. 13 and 14, the upper connector plates 181, 182 receive the upper frame segment 190a, such that the apertures in the upper connector plates 181, 182 align with corresponding upper apertures 191, 192. Likewise, the lower connector plates 181, 182 receive lower the frame segment 190b, such that the apertures in the lower connector plates 181, 182 align with corresponding lower apertures 193, 194. Furthermore, during such assembly of the forward component 170 to the display mounting frame 190, the connector plates 183 receive the upright frame braces 195, 196 such that the apertures in the connector plates 183 align with corresponding apertures 195a, 196a. Subsequently, conventional fastener hardware, such as bolts and nuts, are inserted through the aligned apertures to securely fasten the forward component 170 to the display mounting frame 190.

Referring now to FIGS. 13 and 14, the forward component 170 of FIG. 12 is shown fully assembled and fixedly attached to the display mounting frame 190. As can be seen, in this exemplary implementation of the attachment mechanism 167 of the aerial lift vehicle, the rearward component 169 includes an upright rearward stabilizing member or plate 184 supported thereon, in addition to an upright rear mounting structure 185 spaced forwardly from the upright rearward member 184 and fixedly secured thereto by brackets 185a. As described above, the forward component 170 has the forward stabilizing member or plate 176 fixedly attached to the left and right tubular members 172 and left and right angled tubular members 174. The upright rearward member 184 and upright forward member 176 are coupled together so as to provide increased stability of the display mounting frame 190. More specifically, left and right rigid links 186, such as in the form of fastener rods, extend through at least one and preferably plural corresponding coupling sites 184a, 176a, such as apertures, in the upright rearward and forward members 184, 176. The sites or apertures 184a, 176a are aligned with one another to enable the fixedly coupling and decoupling of the upright rearward and forward members or plates 184, 176 to one another using any known conventional hardware. For example, the links 186 may comprise large rigid bolts extending through and past the rear upright mounting structure 185 of the rearward component 169, as seen in FIGS. 13 and 14, and then fastened in place using nuts. Also, as in the case of the exemplary embodiment shown in FIG. 5, the rearward component 169, as seen in FIG. 14, also includes an upright rear mounting structure 185 having a pair of right-angled members 187 having upper portions 188 attached to the upright rear mounting structure 185 and lower portions in the form of forwardly-projecting tines 189 extending forwardly from the lower ends of the upper portions 188 and parallel to one another such that the tines 189 are configured to slidably insert into and interfit with the rearwardly-projecting elongated tubular members 172 of the forward component 170 of the attachment mechanism 167.

Figure 15:
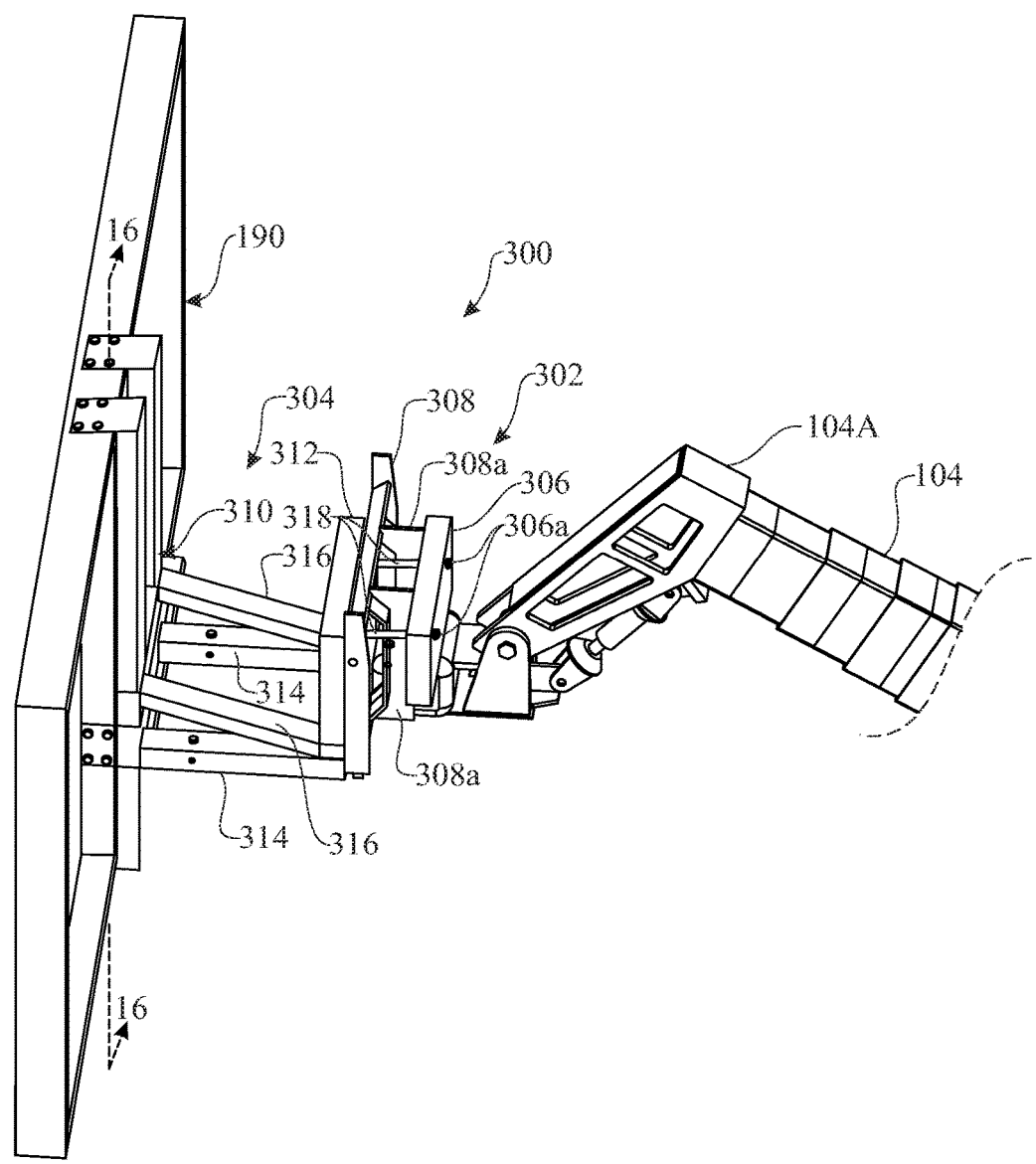
FIG. 15 is a top side isometric view of another alternative attachment mechanism showing the forward component assembled to the advertising display mounting frame and to the rear component of the attachment mechanism.
Figure 16:
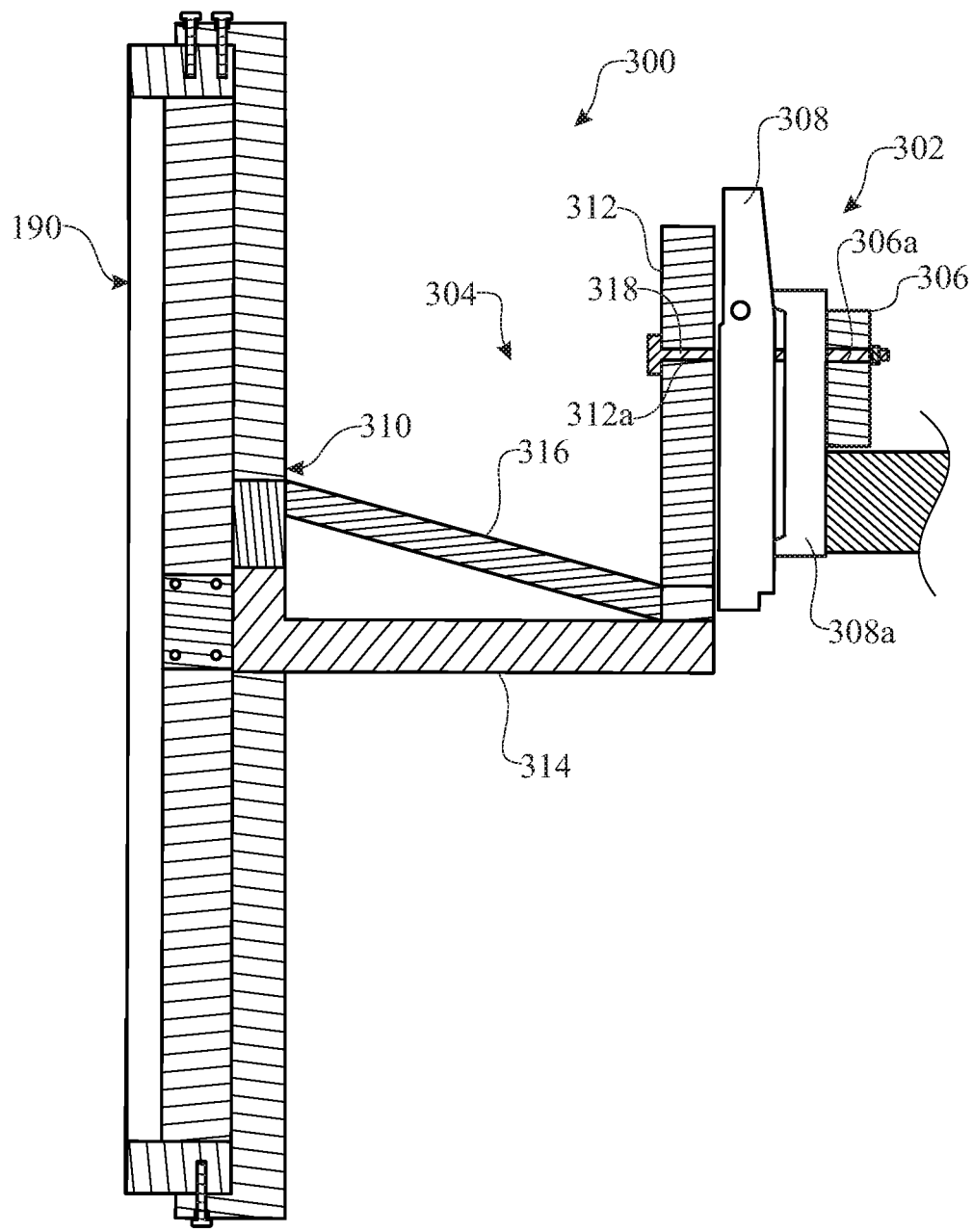
FIG. 16 is a vertical section view of the alternative attachment mechanism and aerial advertising display mounting frame module as seen along section lines 16-16 of FIG. 15.

Referring now to FIGS. 15 and 16, there is illustrated yet another exemplary alternative implementation of an attachment mechanism, generally designated 300, of an aerial advertising display apparatus in accordance with the present invention. The attachment mechanism 300 is supported above a support surface (not shown) by the upper end portion 104A of the aerial lift mechanism 104. The lift mechanism 104 may be actuated to change the elevation of the attachment mechanism 300 above the support surface. This implementation of the attachment mechanism 300 is similar to that of FIGS. 13 and 14; however, to arrive at the attachment mechanism 300, the lower portions or tines 189 of the rear component 169 of the attachment mechanism 167 would be omitted and the rear portions of the tubular members 172 of the forward component 170 extending rearwardly beyond the upright forward member or plate 176 of the forward component 170 would be omitted. With the omission of these two features, the upright forward member or plate 176 of the forward component 132 and the mounting structure 154 of the rearward component 134 would now be placed adjacent to and engaged with one another. Other than those two differences, the basic makeup of the attachment mechanism 300 remains substantially the same as that of the attachment mechanism 167.

Thus, as seen in FIGS. 15 and 16, the attachment mechanism 300 basically includes a rearward component 302 and a forward component 304. The rearward component 302 is attached in any suitable manner to the upper end portion 104A of the aerial lift mechanism 104. The rearward component 302 includes an upright rearward member or plate 306 supported thereon, in addition to an upright rear mounting structure 308 spaced forwardly from the upright rearward member 306 and fixedly secured thereto by brackets 308a. The forward component 304 is attached to and disposed rearwardly of the advertising display mounting frame 190, as described hereinbefore. The forward component 304 has an upright front mounting structure 310, an upright forward member or plate 312, a pair of right and left elongated members 314 and a pair of right and left angled members 316 disposed and aligned above the corresponding right and left elongated members 314. The right and left elongated members 314 are respectively laterally spaced apart and extend fore-and-aft and parallel with one another. The right and left angled members 316 are likewise respectively laterally spaced apart and extend fore-and-aft and parallel with one another. The respective right and left members 314, 316 are fixedly attached at front ends to a rear side of the upright front mounting structure 310, whereas the upright forward member 312 extends transversely between and is fixedly mounted proximate to rear end portions of the right and left elongated members 314 and rear ends of the right and left angled members 316.

The upright forward member 312 of the forward component 304 and the upright rear mounting structure 308 of the rearward component 302 are now placed adjacent to and engaged with or pressed against one another. The upright rearward member 306 and the upright forward member 312 each has at least one and preferably a corresponding plurality of coupling sites 306a, 312a thereon. The respective coupling sites 306a, 312a of the upright rearward and forward members 306, 312 are configured to enable coupling and decoupling the upright rearward and forward members 306, 312, and thereby the rearward and forward components 302, 304, respectively to and from one another. The coupling and decoupling of the upright rearward and forward members 306, 312 to one another are enabled by extending through and past and in opposite fore and aft directions from the rear upright mounting structure 308 and fastening to and unfastening from the respective members 306, 312 at the respective coupling sites 306a, 312a thereon at least one and preferably a corresponding plurality of elongated links 318 so as to correspondingly enable attaching and detaching the advertising display mounting frame 190 to and from the upper end portion 104A of the aerial lift mechanism 104. The coupling sites 306a, 312a in the respective upright rearward and forward members 306, 312, by way of example but not limitation, may take the form of apertures extending through the respective members 306, 312. The elongated links 318, by way of example but not limitation, may take the form of fasteners alignable with and extendible through the apertures in the respective upright rearward and forward members 306, 312.

The upright front mounting structure 310 of the forward component 304 at a front side of the structure 310 is detachably attached to the advertising display mounting frame 190. The upright front mounting structure 310 of the forward component 304 and the advertising display mounting frame 190 and their attachment together is the same as that described above with respect to FIG. 12 and so a detailed description need not be repeated herein.

Figure 17:
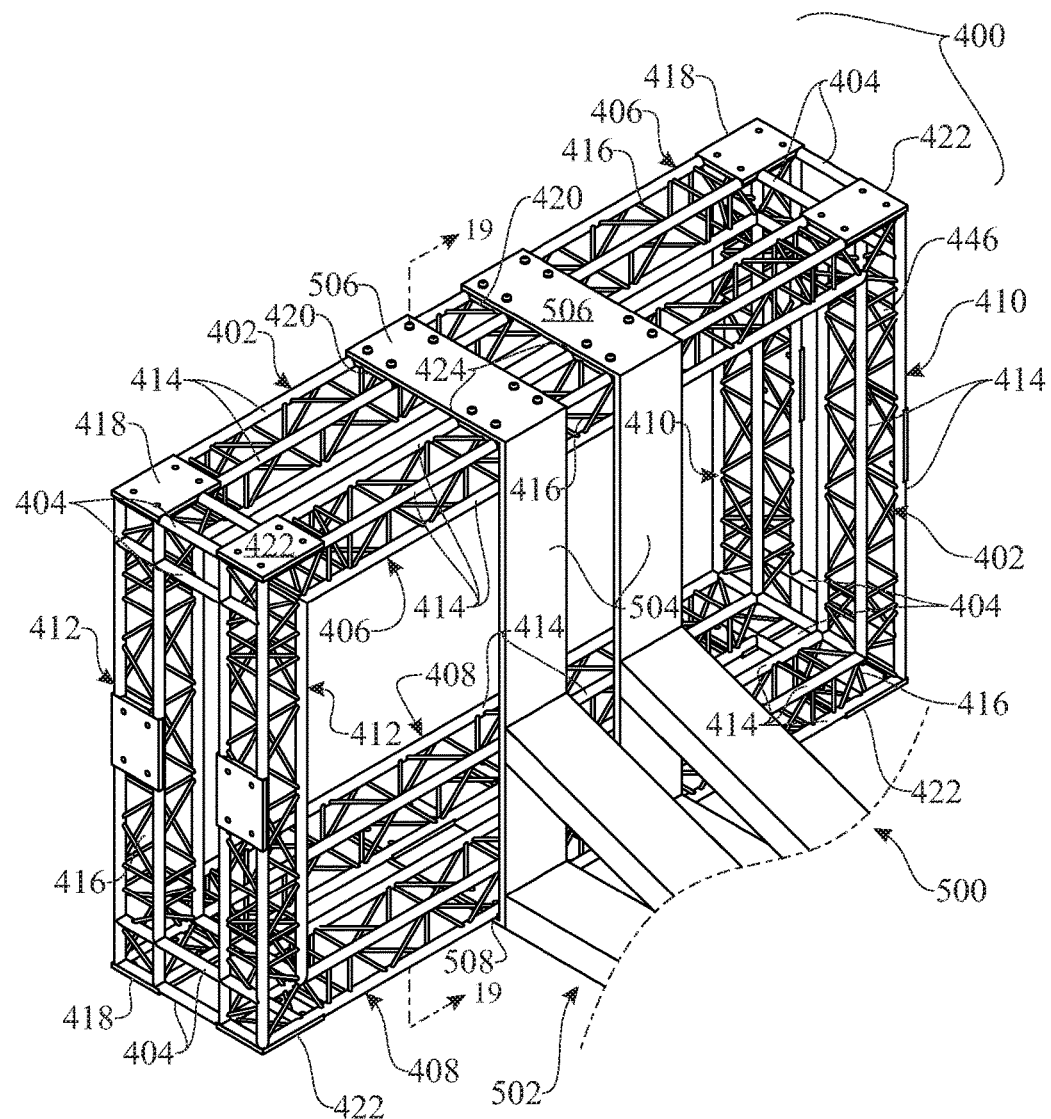
FIG. 17 is a top rear isometric view of a fragmentary portion of a front component of an attachment mechanism of the apparatus shown attached to rear side of an advertising display mounting frame incorporating a plurality of elongated rods and a multiplicity of trusses in accordance with another alternative implementation.
Figure 18:
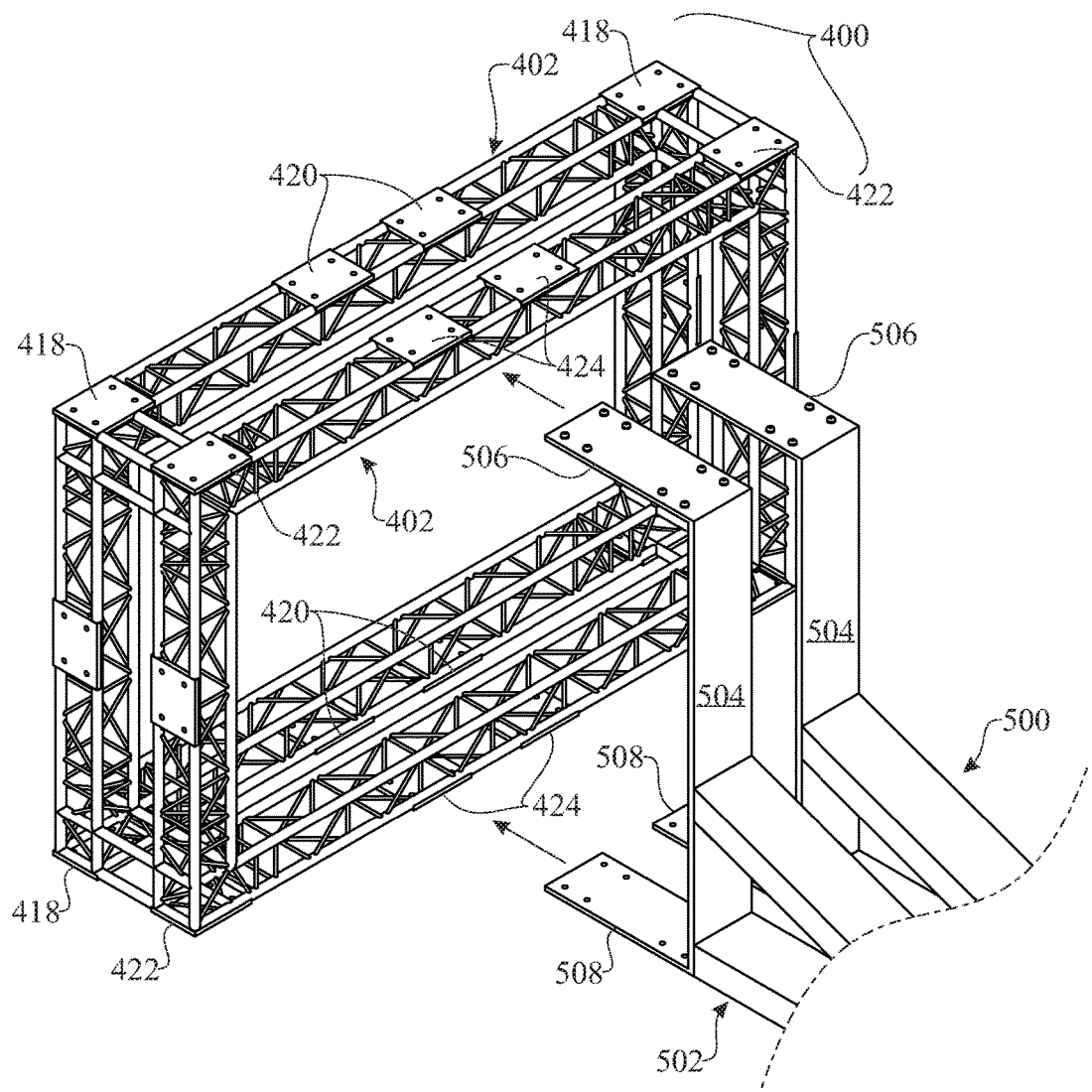
FIG. 18 is a top rear isometric view similar to that of FIG. 17, but now showing the front component of the attachment mechanism detached from the advertising display mounting frame.
Figure 19:
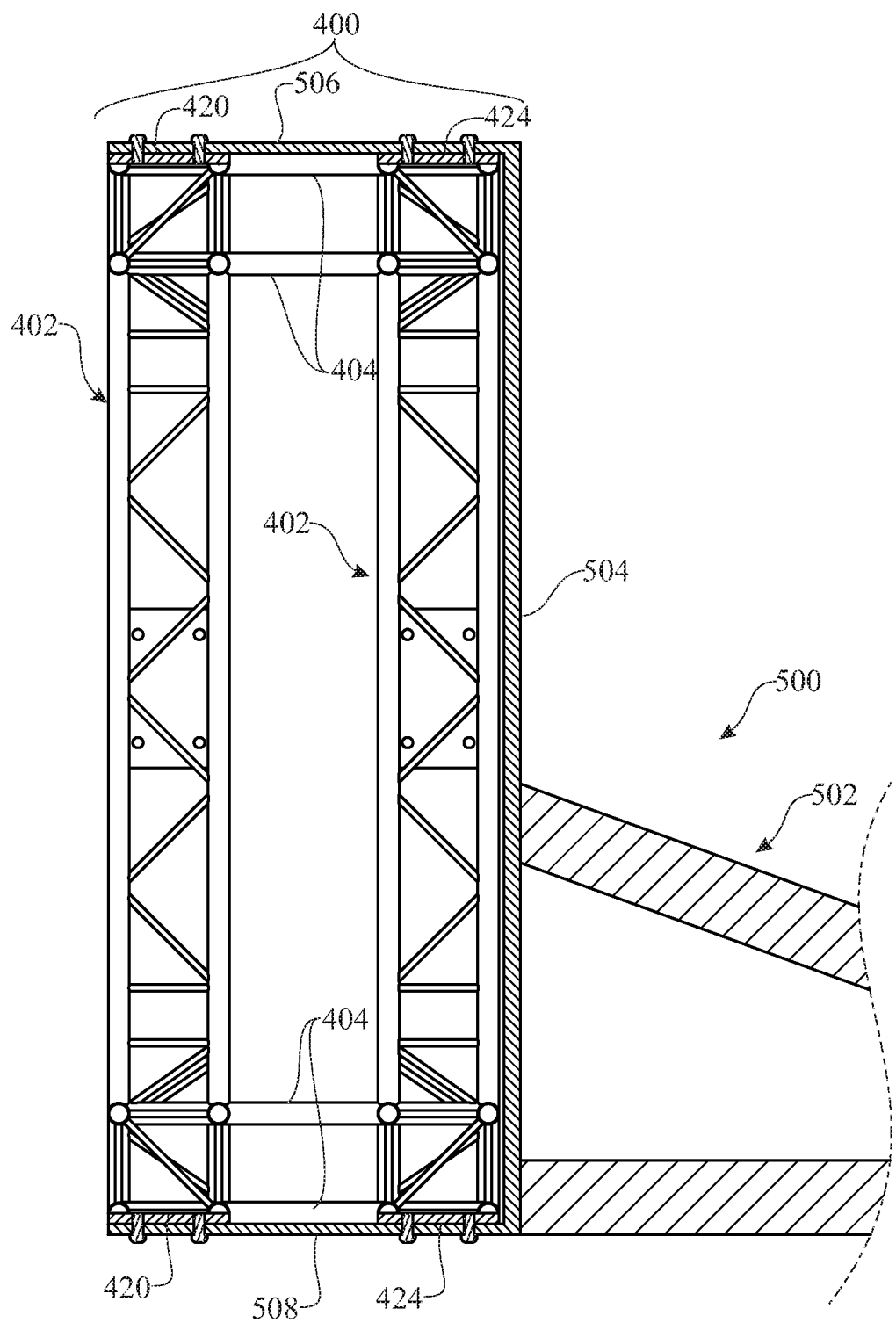
FIG. 19 is a vertical section view of the alternative advertising display mounting frame as seen along section lines 19-19 of FIG. 17.

Referring now to FIGS. 17-19, there is illustrated another exemplary embodiment of an advertising display mounting frame assembly, generally designated 400, and a partially illustrated another exemplary embodiment of an attachment mechanism, generally designated 500, of an aerial advertising display apparatus of the present invention. The advertising display mounting frame assembly 400 is made up of at least one and preferably a pair of advertising display mounting frames 402, being alternatives to that of the advertising display mounting frame 190 shown in FIGS. 12-16. The advertising display mounting frames 402 of the mounting frame assembly 400 are spaced from, and extend parallel to, one another and are interconnected by pluralities of links 404 spanning between and attached to the mounting frames 402 at the respective corresponding corners thereof.

More particularly, each of the mounting frames 402 includes upper and lower brace portions 406, 408 spaced apart from one another, and right and left end brace portions 410, 412 spaced apart from one another and extending between and interconnecting the upper and lower brace portions at the opposite ends thereof. Each of the upper and lower brace portions 406, 408 and each of the right and left end brace portions 410, 412 of the advertising display mounting frames 402 includes a plurality of elongated rods 414 spaced apart and extending parallel to one another and connected together in rectangular configurations so as to define the top, bottom and opposite sides of each of the mounting frames 402. Also, each of the upper and lower brace portions 406, 408 and each of the right and left end brace portions 410, 412 of the advertising display mounting frames 402 includes a multiplicity of reinforcing trusses 416 extending between and attached to the elongated rods 414. Further, each of the upper and lower brace portions 406, 408 of the respective mounting frames 402 has a respective plurality of end and intermediate connector plates 418, 420 and 422, 424 attached along opposite ends and spaced apart intermediate sections of the upper and lower brace portions 406, 408.

The attachment mechanism 500 is supported above a support surface by an upper end portion of an aerial lift mechanism of an aerial advertising display apparatus, the same as disclosed hereinabove in reference to FIGS. 1-4, 6, 7 and 11, being actuatable to change the elevation of the aerial lift mechanism upper end portion, and the attachment mechanism 500 therewith, above the support surface. The attachment mechanism 500 includes a rearward component (not shown, but the same as seen in FIG. 13-14 or 15-16) attached to the upper end portion of the aerial lift mechanism, and a forward component 502 attached to the upper and lower brace portions 406, 408 of the advertising display mounting frames 402. The forward component 502 includes a front upright member (not shown, but the same as seen in FIG. 13-14 or 15-16) coupled to a rear upright member of a rearward component (not shown, but the same as seen in FIG. 13-14 or 15-16) The forward component 502 also includes a pair of upright elongated members 504 laterally spaced apart from one another and extending in a transverse relationship, and being attached, to the upper and lower brace portions 406, 408 of the advertising display mounting frames 402 from midway along the same corresponding side thereof. Each of the upright elongated members 504 has a pair of connector flanges 506, 508 protruding forwardly therefrom at opposite upper and lower ends thereof such that upon placement of the upright elongated members 504 adjacent to the respective side of the upper and lower brace portions 406, 408 of the advertising display mounting frames 402 the connector flanges 506, 508 are configured to overlap and fasten to the intermediate connector plates 420, 424 of the upper and lower braces 406, 408.

Figure 20:
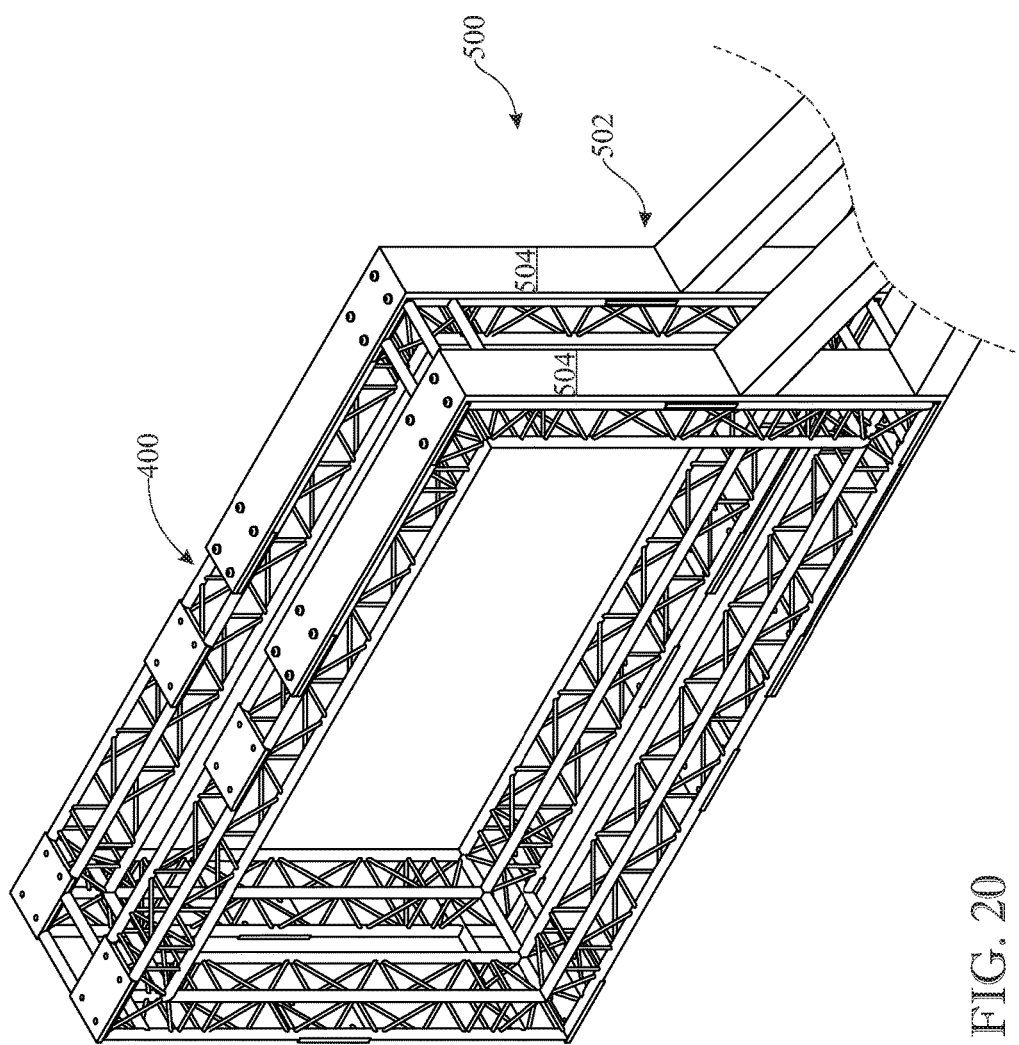
FIG. 20 is a top side isometric view of a fragmentary portion of the front component of the attachment mechanism of the apparatus shown attached to an end of the advertising display mounting frame shown in FIGS. 17 and 18.
Figure 21:
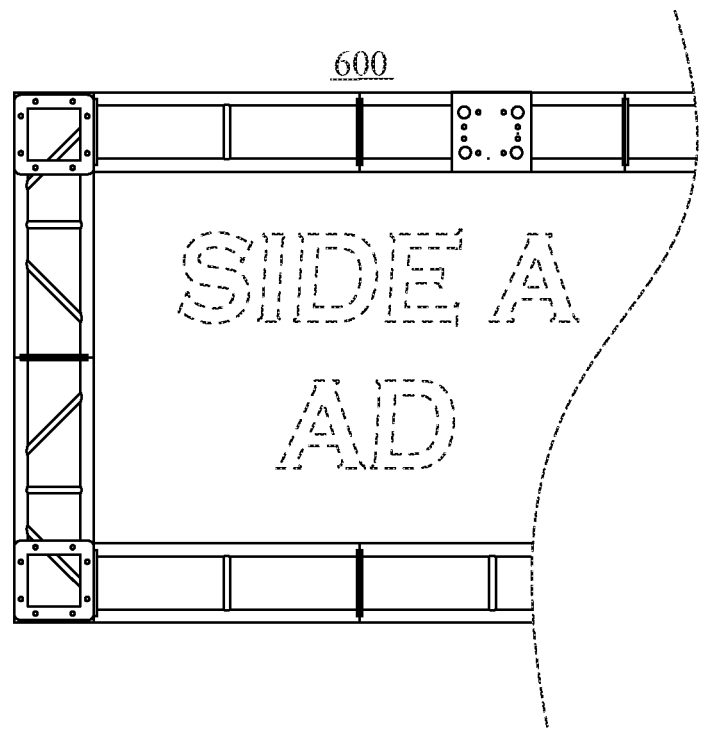
FIG. 21 is a fragmentary diagrammatic view of the advertising display mounting frame showing an advertisement on a side "A" of the mounting frame.
Figure 22:
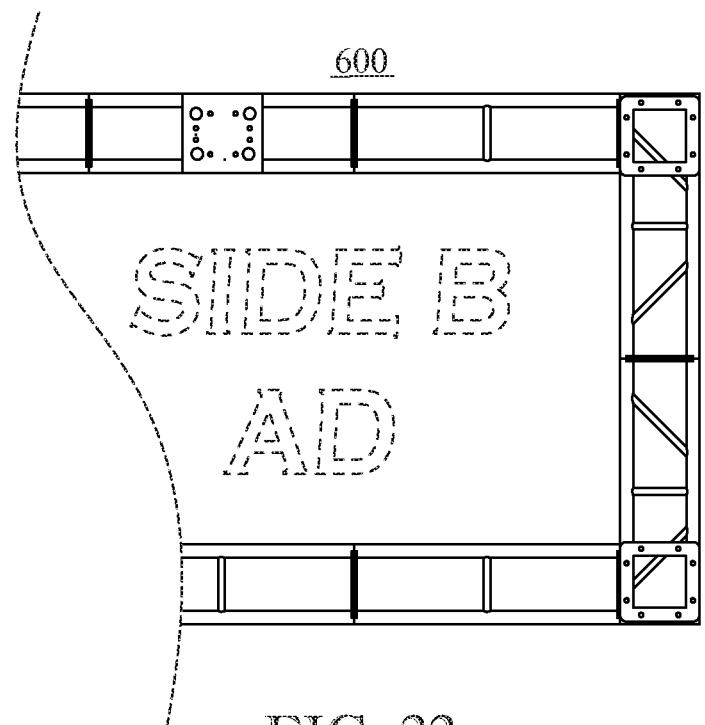
FIG. 22 is a another fragmentary diagrammatic view of the advertising display mounting frame showing an advertisement on a side "B" of the mounting frame.

Referring now to FIG. 20, there is illustrated the same advertising display mounting frame assembly 400 as seen in FIGS. 17-19 but now together with an attachment mechanism 500 only slightly modified from that shown in FIGS. 17-19 in order for the attachment mechanism 500 of FIG. 20 to accommodate approaching the mounting frame assembly 400 from an end orientation rather than from the side orientation. FIGS. 21 and 22 shows front and rear views of an exemplary use of a display mounting frame assembly 600 similar to that FIGS. 17-19 for simultaneously displaying multiple advertisements.

Figure 23:
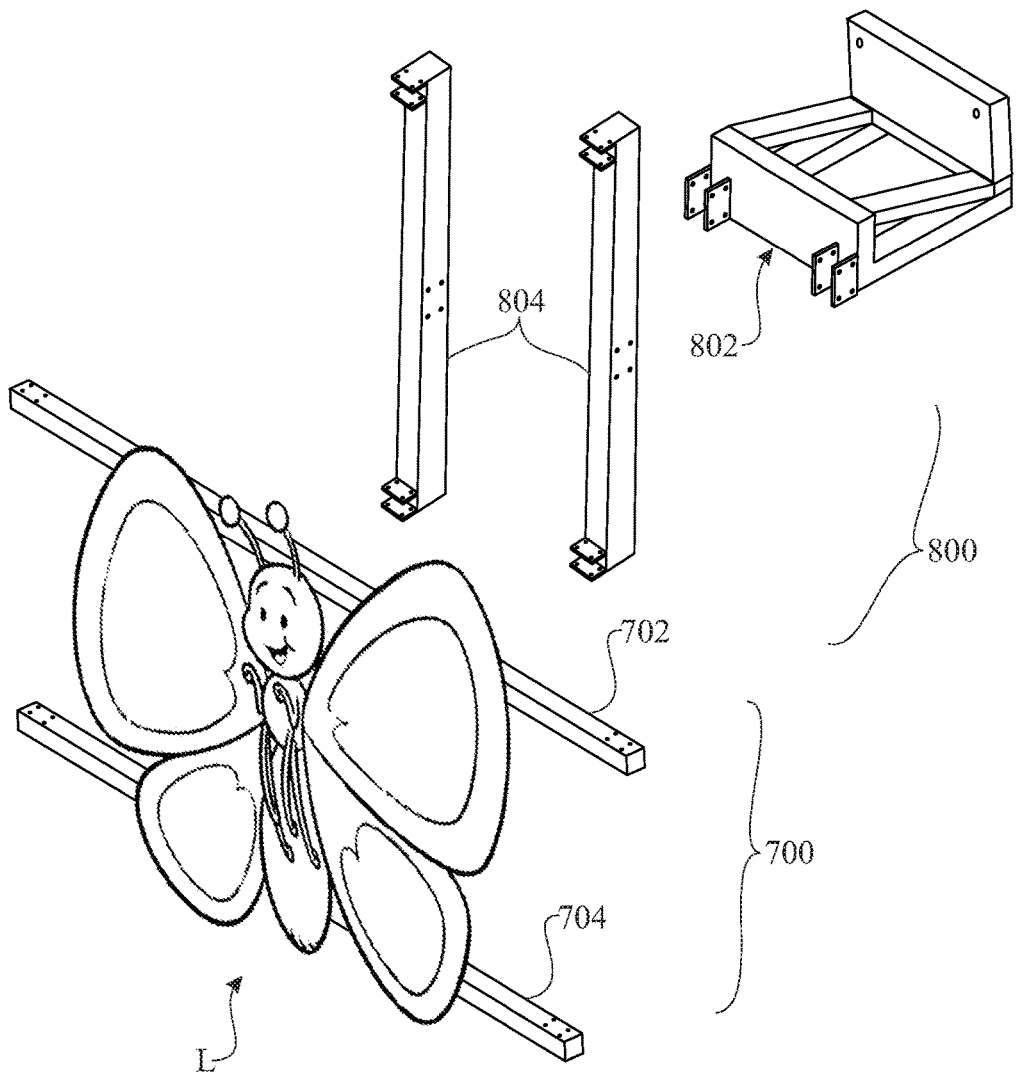
FIG. 23 is a top front isometric exploded view of a forward component of the attachment mechanism of the apparatus, a pair of laterally spaced apart elongated beams of a front mounting structure of the forward component and a pair of laterally spaced apart upright members of the advertising display mounting frame supporting an advertising media.

Referring now to FIG. 23, there is fragmentarily illustrated a mobile aerial advertising display apparatus which includes an advertising display mounting frame 700 and an attachment mechanism 800 having a front component 802 (being substantially the same as the front component 304 in FIGS. 15-16) and a rear component (not shown, also being substantially the same as the rear component 302 in FIGS. 15-16). The advertising display mounting frame 700 has upper and lower brace portions 702, 704 spaced apart from one another and a logo L extending between and mounted to the brace portions. The forward component 802 has a pair of upright elongated members 804 laterally spaced apart from one another and extending in a transverse relationship, and being attachable, to the upper and lower brace portions 702, 704 of the advertising display mounting frame 700 from the same corresponding side thereof to thereby correspondingly detachably attach the advertising display mounting frame 700 thereto.

Referring now to FIGS. 24-27, there is illustrated another exemplary alternative implementation of an attachment mechanism, generally designated 900, of an aerial advertising display apparatus in accordance with the present invention. The attachment mechanism 900 is supported above a support surface (not shown) by the upper end portion 104A of the aerial lift mechanism 104. The lift mechanism 104 may be actuated to change the elevation of the attachment mechanism 900 above the support surface. This implementation of the attachment mechanism 900 is generally similar to that of FIGS. 15 and 16; however, to arrive at the exact construction of the attachment mechanism 900, the following seven modifications would need to be made to the attachment mechanism 300: first, the pair of vertical beams (the same as beams 177, 178 of FIG. 12) of the upright front mounting structure 310 of the forward component 304 would be separate from the pair of right and left elongated members 314 of the forward component 304; second, the pair of right and left angled members 316 are omitted; third, the separated right and left elongated members 314 of the forward component 304 would be pivotally, rather than fixedly, mounted to the upright forward member or plate 312 of the forward component 304; fourth, the right and left elongated members 314 would be hollow or tubular in structure and open at their front ends; fifth, the downwardly extending halves of the vertical beams (the same as beams 177, 178 in FIG. 12) of the upright front mounting structure 310 of the forward component 304 would be omitted leaving only the upwardly extending halves of the vertical beams thereof; sixth, the remaining upper halves of the vertical beams of the upright front mounting structure 310 of the forward component 304 would be relocated rearwardly from the display mounting frame 190 so as to leave a gap therebetween for allowing the pivotally mounted tubular right and left elongated members 314 to insert upwardly over the upper halves of the vertical beams of the upright front mounting structure 310 of the forward component 304; and, seventh, the elongated links 318 would be increased in length allowing them to extend from coupling sites in the interfitted tubular right and elongated members 314 of the forward component 304 and the upper vertical beam halves of the upright front mounting structure 310 of the forward component 304, past the upright forward member or plate 312 of the forward component 304 and the upright rear mounting structure 308 (and brackets 308A) of the rearward component 302 to coupling sites in the upright rearward member or plate 306 of the rearward component 302. With these seven modifications, the assembled arrangement and relationship of the modified components implemented by the attachment mechanism 900 would be as described below with reference to FIGS. 24-27.

Thus, as seen in FIGS. 24-27, the attachment mechanism 900 basically includes a rearward component 902 and a forward component 904. The rearward component 902 is attached in any suitable manner to the upper end portion 104A of the aerial lift mechanism 104. The rearward component 902 includes an upright rearward member or plate 906 supported thereon, in addition to an upright rear mounting structure 908 spaced forwardly from the upright rearward member 906 and fixedly secured thereto by brackets 908a. The forward component 904 is attached to and disposed rearwardly of the advertising display mounting frame 190, as described hereinbefore. The forward component 904 has an upright front mounting structure 910, an upright forward member or plate 912, and a pair of right and left elongated members 914.

More particularly, the upright front mounting structure 910 of the forward component 904 has a pair of laterally spaced apart vertical beams 916 and a corresponding pair of upper tabs 918 affixed to and extending forwardly from upper ends of the vertical beams 916. The upper tabs 918 when attached to the upper frame segment 190a of the display mounting frame 190 space the pair of vertical beams 916 of the upright front mounting structure 910 rearwardly from the display mounting frame 190, thereby leaving a gap 920 therebetween. The right and left elongated members 914 of the forward component 904 are respectively laterally spaced apart and extend fore-and-aft and parallel with one another. Also, they are tubular in structure, open at their front ends and pivotally mounted at their rear ends to the lower end of the upright front member or plate 912 of the forward component 904.

Figure 24:
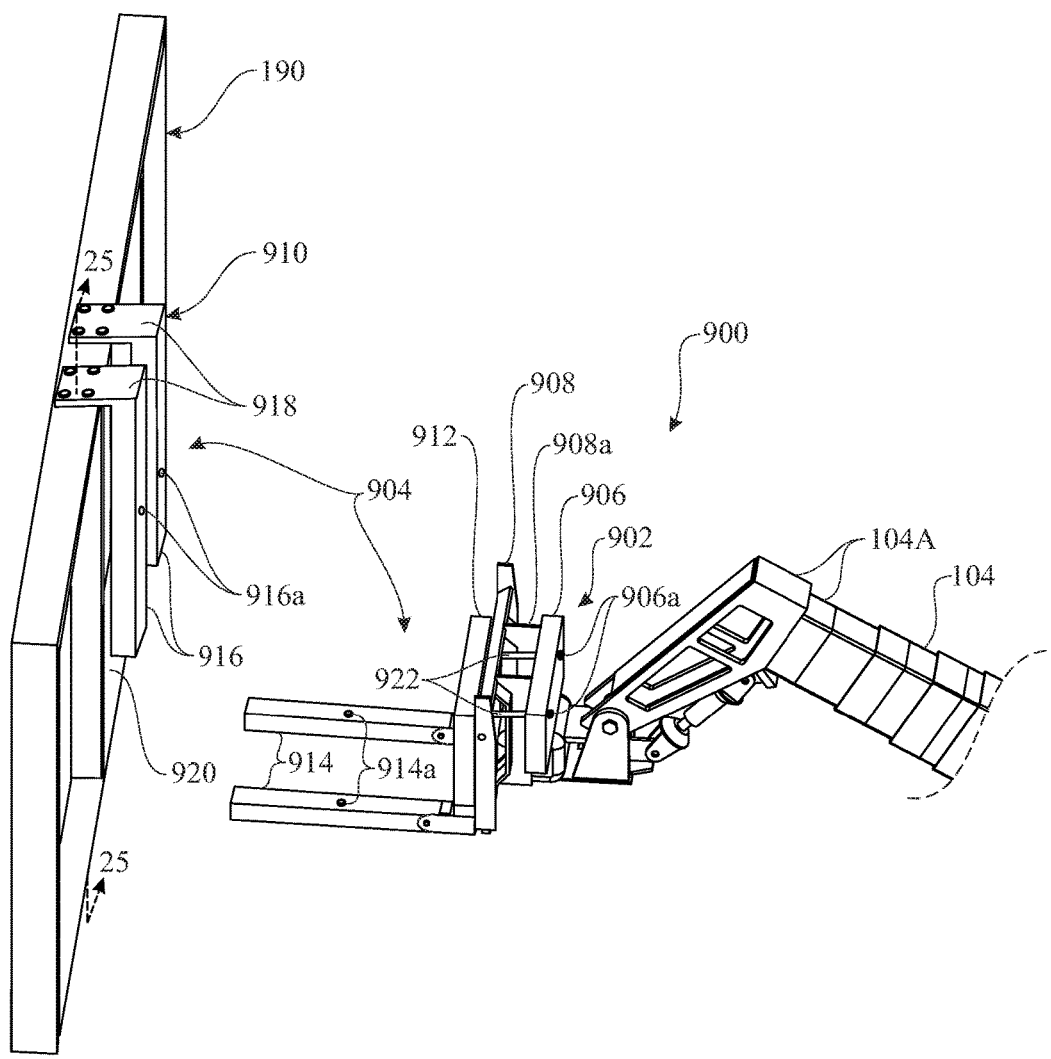
FIG. 24 is a top front isometric exploded view of still another alternative embodiment of an aerial advertising display apparatus in accordance with the present invention, illustrating forward and rearward components of an attachment mechanism respectively assembled to an advertising display mounting frame and an upper end portion of a lift mechanism of the apparatus, but detached from one another such that an advertising display mounting frame is decoupled from the upper end portion of the lift mechanism.
Figure 25:
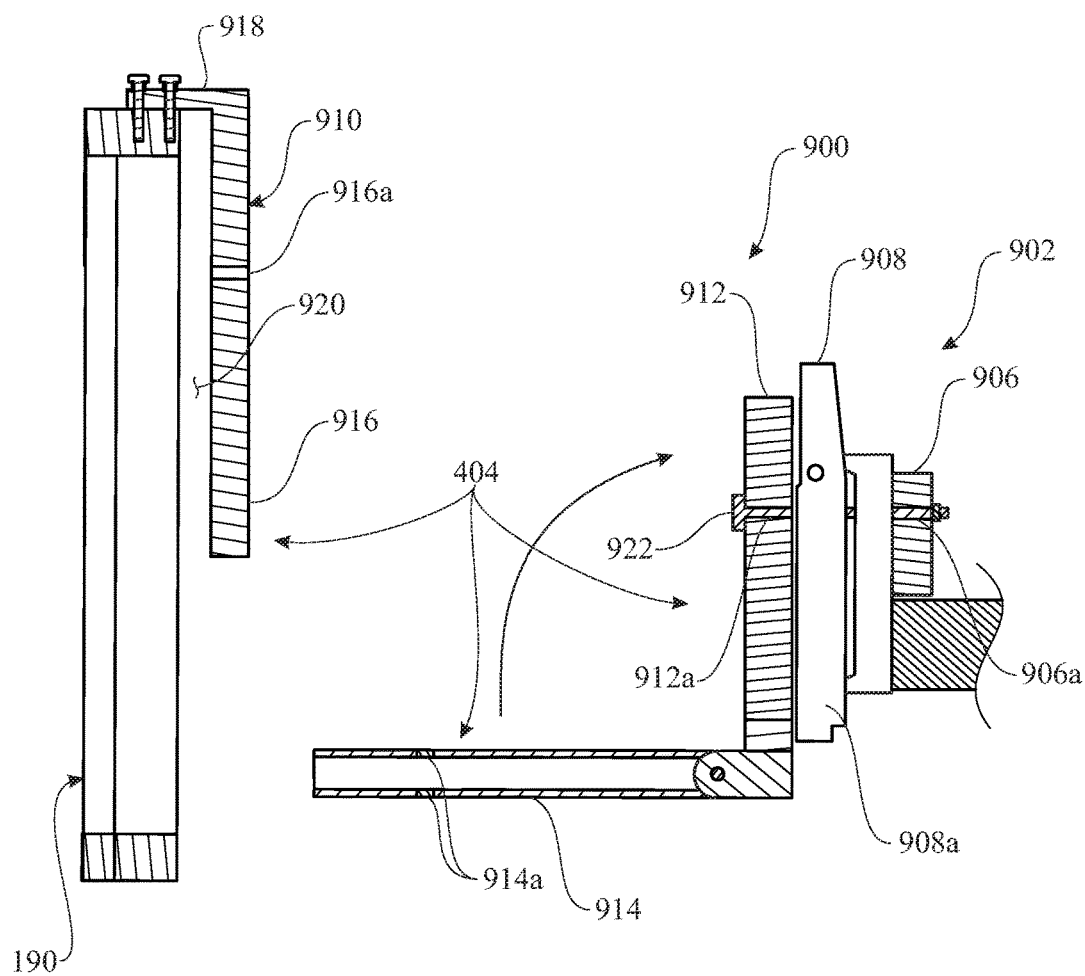
FIG. 25 is an enlarged vertical section view of the attachment mechanism and the advertising display mounting frame as seen along section lines 25-25 of FIG. 24, illustrating tubular members of the forward component about to be pivotally moved toward upright positions in preparation to being brought into alignment with an upright front mounting structure of the forward component attached to the advertising display mounting frame.
Figure 26:
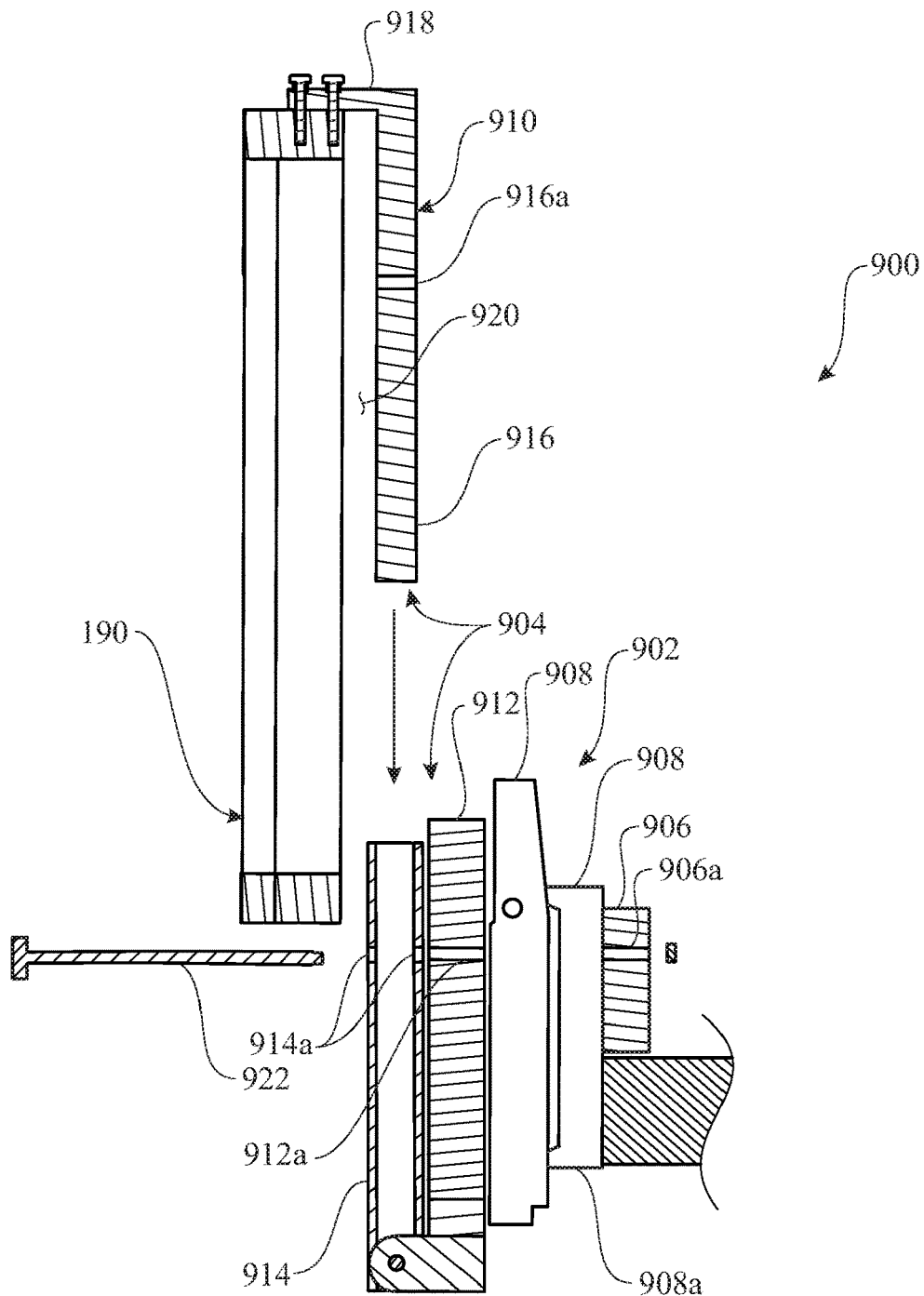
FIG. 26 is another vertical section view of the attachment mechanism and the advertising display mounting frame shown in FIG. 25, but now illustrating the tubular members of the forward component disposed below and brought into alignment with the upright front mounting structure of the forward component.
Figure 27:
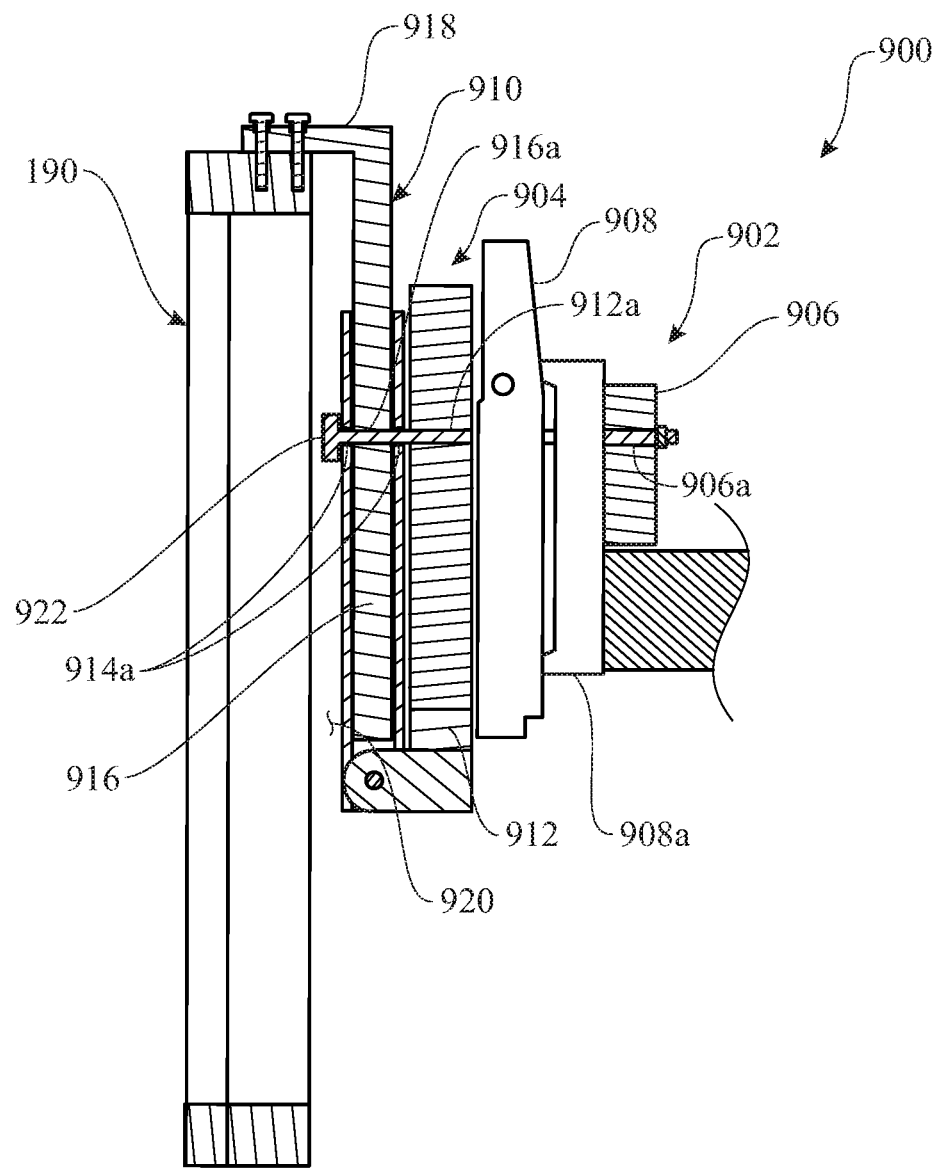
FIG. 27 is still another vertical section view of the attachment mechanism and the advertising display mounting frame shown in FIGS. 25 and 26, but now illustrating the tubular members of the forward component of the attachment mechanism coupled with the upright front mounting structure of the forward component of the attachment mechanism, the forward component of the attachment mechanism, in turn, being coupled with the rearward component of the attachment mechanism.

The right and left elongated members 914 are pivoted approximately ninety degrees from their horizontal position in FIGS. 24 and 25 to their vertical position in FIG. 26 where they are disposed below and in alignment with the vertical beams 916 of the upright front mounting structure 910 of the forward component 904. The right and left elongated members 914 are then elevated and inserted over the vertical beams 916 and through the gap 920 to the position shown in FIG. 27. The right and left elongated members 914 of the forward component 904, the vertical beams 916 of the upright front mounting structure 910, the upright forward member 912 of the forward component 904, the upright rear mounting structure 908 (with its brackets 908a) of the rearward component 902 and the upright rearward member or plate 906 of the rearward component 902 are all now placed adjacent to and against one another.

The right and left elongated members 914, the vertical beams 916, the upright forward member 912, and the upright rearward member 906 each has at least one and preferably a corresponding plurality of coupling sites 914a, 916a, 912a, 906a thereon. These respective coupling sites are configured to enable coupling and decoupling these components respectively to and from one another. The coupling and decoupling of these components to one another are enabled by extending through and past and in opposite fore and aft directions from the upright rear mounting structure 908 with its brackets 908a) and fastening to and unfastening from the respective members at the respective coupling sites thereon at least one and preferably a corresponding plurality of elongated links 922 so as to correspondingly enable attaching and detaching the advertising display mounting frame 190 to and from the upper end portion 104A of the aerial lift mechanism 104. Thus, the elongated links 922 extend from coupling sites 914a, 916a in the interfitted tubular right and elongated members 914 of the forward component 904 and the upper vertical beams 916 of the upright front mounting structure 910 of the forward component 904, through coupling site 912a of the upright forward member or plate 912 of the forward component 904 and past the upright rear mounting structure 908 (and brackets 908a) of the rearward component 902 to coupling sites 906a in the upright rearward member or plate 906 of the rearward component 902. The coupling sites in the respective members, by way of example but not limitation, may take the form of apertures extending through the respective members. The elongated links 922, by way of example but not limitation, may take the form of fasteners alignable with and extendible through the apertures in the respective members.

The upright front mounting structure 910 of the forward component 904 at a front side of the structure 910 is detachably attached to the advertising display mounting frame 190 by suitable fasteners. The upright front mounting structure 910 of the forward component 904 and the advertising display mounting frame 190 and their attachment together is the same as that described above with respect to FIGS. 12-15 and so a detailed description need not be repeated herein.

Figure 28:
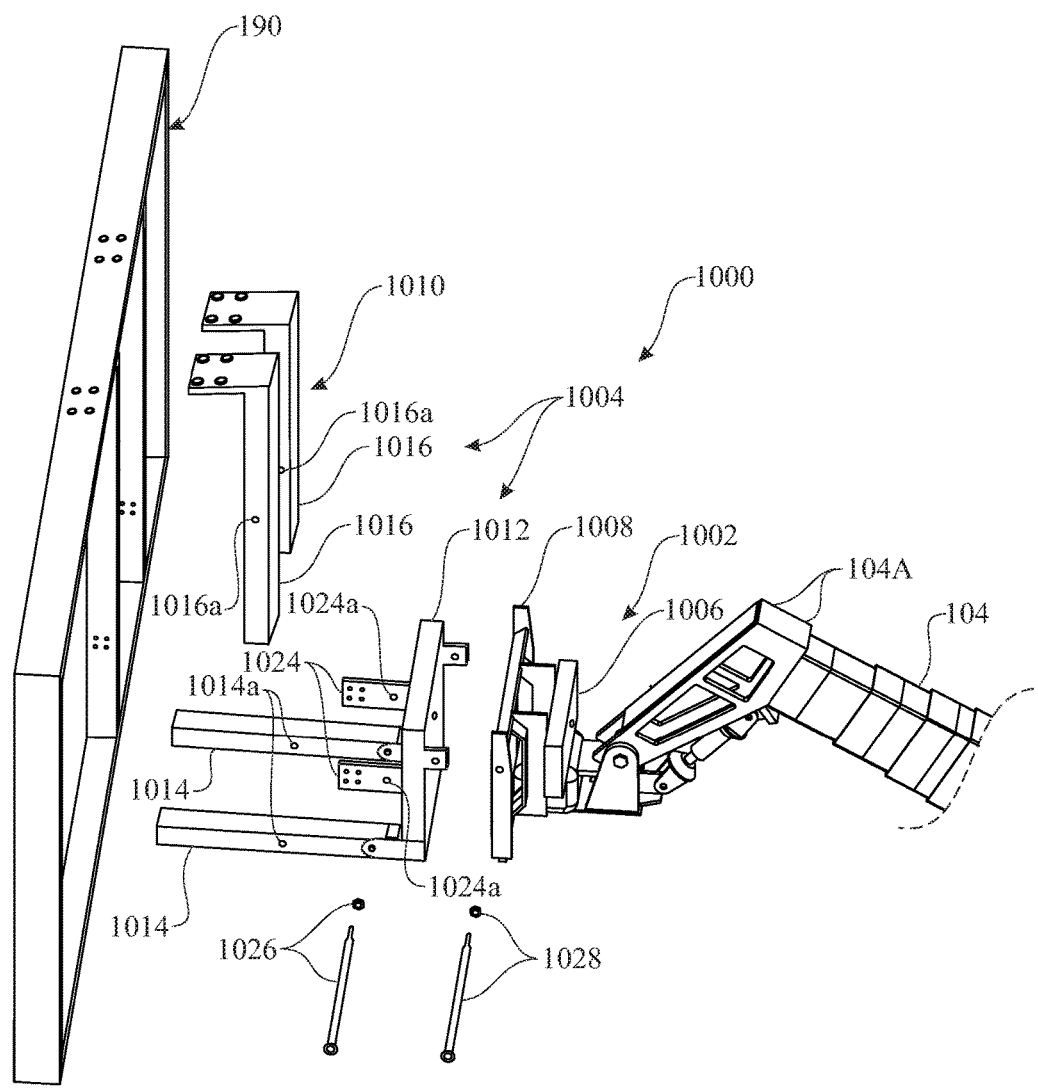
FIG. 28 is an top side isometric exploded view of yet another alternative embodiment of an aerial advertising display apparatus in accordance with the present invention, illustrating forward and rearward components of an attachment mechanism respectively assembled to an advertising display mounting frame and an upper end portion of a lift mechanism of the apparatus, illustrating a coupling and decoupling of tubular members and upright front mounting structure of the forward component of the attachment mechanism with one another and also with the rearward component of the attachment mechanism being alternative to that of the attachment mechanism of FIGS. 24-27.
Figure 29:
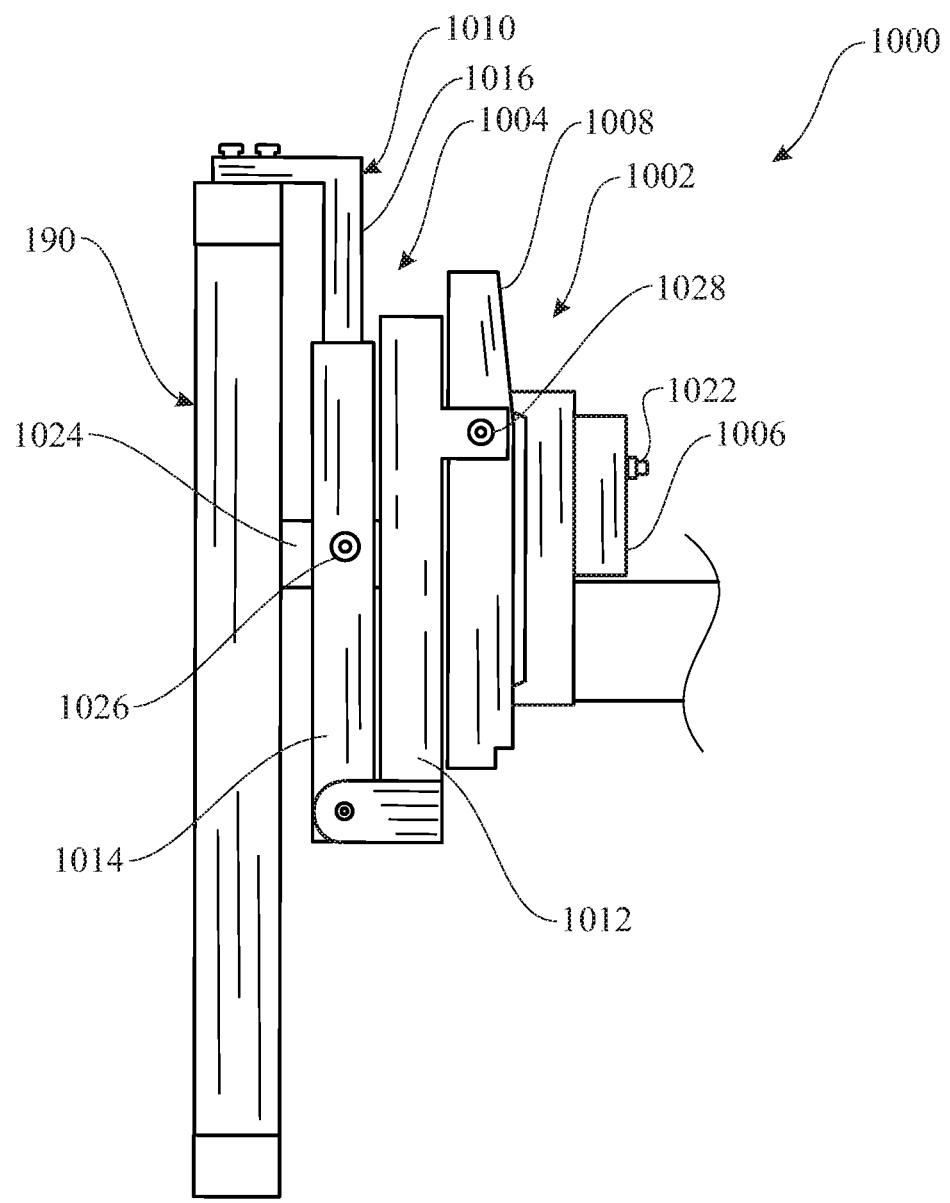
FIG. 29 is a side elevation assembled view of the attachment mechanism of FIG. 28.

Referring now to FIGS. 28 and 29, there is illustrated yet another exemplary alternative implementation of an attachment mechanism, generally designated 1000, of an aerial advertising display apparatus in accordance with the present invention. The attachment mechanism 1000 is supported above a support surface (not shown) by the upper end portion 104A of the aerial lift mechanism 104. The lift mechanism 104 may be actuated to change the elevation of the attachment mechanism 1000 above the support surface. This implementation of the attachment mechanism 1000 differs from that of FIGS. 24-27 in that an alternative way is employ to couple the forward component 1004 of the attachment mechanism 1000 to the display mounting frame 190, the elongated members 1014 and the upright front mounting structure 1010 of the forward component 1004 of the attachment mechanism 1000 with one another and also with the rearward component 1002 of the attachment mechanism 1000.

More particularly, the upright forward member 1012 has affixed thereto a pair of connectors 1024 disposed above and between the elongated members 1014. The connectors 1024 extend forwardly so as to align with and be detachably attachable to complementary portions (apertures) 195a, 196a of the advertising display mounting frame 190. The vertical beams 1016 of the front mounting structure 1010, the elongated members 1014 pivotally mounted to the upright forward member 1012 and the connectors 1024 extending forwardly from the upright forward member 1012 have respective coupling sites 1016a, 1014a, 1024a thereon being configured to align with one another when the vertical beams 1016 and elongated members 1014 are in the vertical interfitted position. Another elongated link 1026, being separate from the elongated links 1022, is configured to detachably attach the coupling sites 1016a and 1014a on the vertical beams 1016 and elongated members 1014, when in the vertical interfitted position, to the coupling sites 1024a on the connectors 1024 separately from the coupling of the upright forward member 1012 of the forward component 1004 to the upright rear mounting structure 1008 and upright rearward member 1006. Still another link 1028, being separate from the links 1022, 1026, is used to connect the upright forward member 1012 of the forward component 1004 to the upright rear mounting structure 1008 of the rearward component 1002. As will be apparent to those skilled in the art, although rod, or link 1028, is depicted extending in one direction it is clearly within the scope of the present invention to incorporate a link 1028 extending in both directions and having couplings at opposite ends to attach directly to, for example, an aluminum truss or other structure. Still other variations and alternatives are contemplated including, for example, utilization of a crane boom extension as an attachment location for the adapter (which may, for example, require the addition of solid support plates or other additional structural support elements).

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

For example, although the various implementations of the invention are described and shown herein with respect to particular aerial lifting equipment, it will be readily apparent to those skilled in the art that the scope of the present invention is intended to be very broad in scope and may be adapted for use with a myriad of different aerial lifting machines including, but not limited to, telescoping boom lifts, articulated boom lifts, scissor lifts, bucket truck lifts and any other type of construction lift. While such lifts are conventionally utilized to enable workers to reach high objects for maintenance work, the present invention is broadly geared toward providing various implementations of an adapter subassembly for effectively and efficiently engaging a variety of structures, such as advertising truss assemblies, lighting subassemblies, audio subassemblies and variations thereof.

What is claimed is:

1. An aerial advertising display apparatus, comprising:
   an aerial advertising display support framework;
   a ground-supported mobile vehicle including a body having an aerial lift mechanism mounted thereto at a proximal end of the aerial lift mechanism, the aerial lift mechanism extendible outwardly and away from said mobile vehicle body and terminating at an aerial lift mechanism distal end, said aerial lift mechanism proximal end mounted upon said mobile vehicle body at a location and in a manner enabling the lift mechanism proximal end to be angularly rotated such that the aerial lift mechanism remains unimpeded by said mobile vehicle body;
   an attachment mechanism interposed between and interconnecting said aerial advertising display support framework and the distal end of said aerial lift mechanism, the aerial lift mechanism selectively actuatable to controllably change the spatial position of said aerial lift mechanism distal end, and said corresponding attachment mechanism and aerial display support framework therewith, vis-à-vis a ground surface upon which said mobile vehicle is being supported, said attachment mechanism including
      a rearward component pivotally coupled at a rearmost portion of the rearward component to a pivot point of said distal end of said aerial lift mechanism, a forward portion of said rearward component having at least one aperture provided therein,
      a forward component interposed between the rearward component and the aerial advertising display support framework, the forward component attached to, and extending in a direction rearwardly away from, said aerial advertising display support framework, a forward portion of said forward component having a front mounting structure configured for releasable attachment to the advertising display support framework a rearward portion of said forward component having at least one aperture extending therethrough, and
      at least one elongated rod extending through said respective apertures in said rearward portion of said forward component and said forward portion of said rearward component, and positioned spaced-apart a distance forward of the pivot point of said aerial lift mechanism distal end in a manner enabling indirect selective coupling and decoupling of said aerial advertising display support framework to said distal end of said aerial lift mechanism, such that, when fully assembled, the forward and rearward components of said attachment mechanism are pivotable about the pivot point of the aerial lift mechanism distal end, but not pivotable with respect to each other.

2. An aerial advertising display apparatus as recited in claim 1 wherein said aerial lift mechanism further comprises at least one of a telescopically-extendible and retractable aerial lift mechanism and an articulated lift mechanism.

3. An aerial advertising display apparatus as recited in claim 1 wherein said proximal end of said mobile vehicle aerial lift mechanism is mounted to said mobile vehicle body in a manner enabling unimpeded angular rotational movement of said aerial lift mechanism vis-à-vis said mobile vehicle body.

4. An aerial advertising display apparatus as recited in claim 1 wherein said ground-supported mobile vehicle further comprises: a wheeled vehicle.

5. An aerial advertising display apparatus as recited in claim 1 wherein said front mounting structure of said forward component further comprises:
   at least one elongated member extending forwardly from said attachment mechanism forward component and terminating at an elongated member distal end configured for releasable attachment to said advertising display support framework.

6. An aerial advertising display apparatus as recited in claim 5, further comprising:
   at least one elongated member affixed to and extending rearwardly from said aerial advertising display framework and terminating at a distal end;
   said distal end of said at least one elongated member affixed to said aerial advertising display framework sized, shaped and otherwise configured for selective coupling with said distal end of said at least one elongated member extending forwardly from said attachment mechanism forward component.

7. An aerial advertising display apparatus as recited in claim 6 wherein said at least one elongated member extending forwardly from said attachment mechanism forward component further comprises a pair of spaced-apart parallel elongated beams, and said at least one elongated member extending rearwardly from said aerial advertising display framework further comprises a pair of spaced-apart parallel elongated beams.

8. An aerial advertising display apparatus as recited in claim 7 wherein a first one of said pairs of spaced-apart elongated beams further comprises a pair of spaced-apart hollow beams, and a second one of said pairs of spaced-apart elongated beams is sized, shaped and otherwise configured for being snugly received within said pair of spaced-apart hollow beams.

9. An aerial advertising display apparatus as recited in claim 1 wherein said front mounting structure of said forward component further comprises a framework structure selectively attachable to said aerial advertising display framework structure.

10. An aerial advertising display apparatus as recited in claim 9 wherein said framework structure of said front mounting structure further comprises at least one connector plate selectively attachable to said aerial advertising display framework.

11. An aerial advertising display apparatus as recited in claim 9 wherein said aerial advertising display framework further comprises at least one connector plate selectively attachable to said framework structure of said front mounting structure.

12. An aerial advertising display apparatus as recited in claim 1 wherein the distal end of aerial lift mechanism is configured for at least one of lateral and vertical rotation to enable corresponding selective lateral and/or vertical rotation of said aerial advertising display apparatus with respect to said mobile vehicle ground-supporting surface.

13. An aerial advertising display apparatus as recited in claim 1, further comprising an advertising panel substrate disposed about an exterior portion of said aerial advertising display framework.

14. An aerial advertising display apparatus as recited in claim 1 wherein said aerial advertising display framework further comprises a rectangular aerial advertising display framework.

15. An aerial advertising display apparatus as recited in claim 1 wherein said aerial advertising display framework further comprises a non-rectangular three-dimensional geometric aerial advertising display framework.

16. A mobile aerial advertising display apparatus, comprising:
an advertising display mounting framework comprising a plurality of brace portions;
a ground-supported mobile vehicle having a chassis;
a lift mechanism in the form of an arm having a proximal end and a distal end, said proximal arm end mounted to said mobile vehicle chassis and extendible outwardly therefrom, and said arm controllably actuatable from said mobile vehicle chassis, the distal end of the lift mechanism having at least one aperture extending therethrough defining a pivot point; and
an attachment mechanism supported above the ground by said distal end of said lift mechanism, said attachment mechanism including
a rearward portion configured for selective attachment at the pivot point of said distal end of said lift mechanism via a first rod extending through the at least one aperture of the distal end of the lift mechanism and at least one aperture aligned therewith extending through a rearmost end of the attachment mechanism rearward portion,
a forward portion having a forward end configured for selective attachment to said advertising display mounting framework and having a rearward end including at least one aperture extending therethrough, and a second rod extending through the at least one aperture in the rearward end of the forward portion and at least one aperture aligned therewith extending through a forward end of the attachment mechanism forward portion,
wherein, the second rod fixedly couples the rearward and forward portions of the attachment mechanism to one another a distance forward of said pivot point in a manner effectively preventing movement of the rearward and forward portions with respect to one another, and wherein the first rod couples the rearward portion of the attachment mechanism to the distal end of the lift mechanism in a manner enabling rotation of said rearward portion about said pivot point.

* * * * *